United States Patent [19]

Ishida

[11] Patent Number: 5,691,713
[45] Date of Patent: Nov. 25, 1997

[54] COMMUNICATION APPARATUS ALLOWING A RECEIVER TO RECOGNIZE A GENERALIZED SITUATION OF A SENDER

[75] Inventor: Eiji Ishida, Kanagawa, Japan

[73] Assignee: Fuji Xerox Co., Ltd., Japan

[21] Appl. No.: 718,013

[22] Filed: Sep. 3, 1996

Related U.S. Application Data

[63] Continuation of Ser. No. 373,447, Jan. 17, 1995, abandoned.

[30] Foreign Application Priority Data

Jan. 18, 1994 [JP] Japan .................................. 6-016958

[51] Int. Cl.$^6$ .......................... G08C 17/00; G08C 19/16
[52] U.S. Cl. ................ 340/870.01; 364/420; 370/110.1; 375/219; 375/220; 379/88; 379/89
[58] Field of Search ........................ 379/88, 89

[56] References Cited

U.S. PATENT DOCUMENTS

| | | | |
|---|---|---|---|
| 4,882,743 | 11/1989 | Mahmoud | 379/53 |
| 5,003,532 | 3/1991 | Ashida et al. | 370/62 |
| 5,009,510 | 4/1991 | Blinken, Jr. et al. | 379/202 |
| 5,124,915 | 6/1992 | Krenzel | 364/420 |
| 5,253,057 | 10/1993 | Terui et al. | 358/136 |
| 5,309,434 | 5/1994 | Maekawa | 370/62 |
| 5,379,298 | 1/1995 | Saiki et al. | 370/79 |
| 5,381,338 | 1/1995 | Wysocki et al. | 364/449 |
| 5,392,223 | 2/1995 | Caci | 364/514 |
| 5,434,611 | 7/1995 | Tamura | 348/8 |
| 5,438,428 | 8/1995 | Itoh | 358/436 |
| 5,440,554 | 8/1995 | Stannard et al. | 370/60.1 |

FOREIGN PATENT DOCUMENTS

| | | |
|---|---|---|
| 2-84860 | 3/1990 | Japan . |
| 3-58658 | 3/1991 | Japan . |
| 3-119476 | 5/1991 | Japan . |
| 3-119477 | 5/1991 | Japan . |
| 3-119478 | 5/1991 | Japan . |
| 3-157029 | 7/1991 | Japan . |

OTHER PUBLICATIONS

"Toward An Open Collaboration Media", Information Media of Information Processing Society of Japan, 3-2, pp. 1-8, (1991).

"A Computer-Supported Multiparticipant Teledialogue System ASSOCIA" Y. Nakamura et al., Transactions of Information Processing Society of Japan 32:9(1190-1199) 1991.

"Multimedia Desktop Conferencing System: MERMAID, "Transactions of Information Processing Society of Japan, 32:9(1200-1209) 1991.

"VideoDraw: A Video Interface for Collaborative Drawing", J.C. Tang et al., ACM Transactions on Information Systems, 9:3(171-184) 1991.

"Europarc's Integrated Interactive Intermedia Facility (IIIF): Early Experiences", B. Buxton et al., Multi-User Interfaces and Applications, pp. 11-34, 1990.

"Audio Video Enhanced Collaboration and Telepresence", M. Mantei, '91 Intrnational Symposium on Next Generation Human Interface, pp. 1-9 1991.

*Primary Examiner*—Jeffery Hofsass
*Assistant Examiner*—Timothy Edwards, Jr.
*Attorney, Agent, or Firm*—Finnegan, Henderson, Farabow, Garrett & Dunner, L.L.P.

[57] ABSTRACT

In a transmitting section, image data, voice data and screen data indicating situations of a sender are produced, and converted to generalized situation data by, for instance, thinning those data. Upon request from a receiver, the generalized situation data are transmitted to the receiving section via a network, and output, for instance, in a sequential manner, to allow the receiver to recognize the situations of the sender.

18 Claims, 23 Drawing Sheets

FIG. 17

| MEDIUM \ LEVEL | 5 | 4 | 3 | 2 | 1 |
|---|---|---|---|---|---|
| IMAGE | PRESENTATION OF 1 SEC. PER 10 MIN. PLUS QUANTIZATION (LARGE) | PRESENTATION OF 1 SEC. PER 1 MIN. PLUS QUANTIZATION (SMALL) | PRESENTATION OF 1 SEC. PER 1 MIN. | PRESENTATION OF 1 SEC. PER 10 SEC. | REAL TIME PRESENTATION |
| VOICE | PRESENTATION OF 1 SEC. PER 10 MIN. PLUS NOISE MIXING (LARGE) | PRESENTATION OF 1 SEC. PER 1 MIN. PLUS NOISE MIXING (SMALL) | PRESENTATION OF 1 SEC. PER 1 MIN. | PRESENTATION OF 1 SEC. PER 10 SEC. | REAL TIME PRESENTATION |
| SCREEN | PRESENTATION OF 1 SEC. PER 10 MIN. PLUS QUANTIZATION (LARGE) | PRESENTATION OF 1 SEC. PER 1 MIN. PLUS QUANTIZATION (SMALL) | PRESENTATION OF 1 SEC. PER 1 MIN. | PRESENTATION OF 1 SEC. PER 10 MIN. | REAL TIME PRESENTATION |

FIG. 20

| MEDIUM / RECEIVER | MR. X | MR. Y | MR. Z |
|---|---|---|---|
| IMAGE | 3 | 5 | 5 |
| VOICE | 4 | 3 | 5 |
| SCREEN | 3 | 4 | 5 |

FIG. 21

| MEDIUM / RECEIVER | MR. X | MR. Y | MR. Z |
|---|---|---|---|
| IMAGE | 2 | 4 | 4 |
| VOICE | 1 | 2 | 4 |
| SCREEN | 2 | 4 | 4 |

FIG. 23

| CONDITION<br>MEDIUM | HAVING VISITOR/<br>MEETING | PREPARING A<br>DOCUMENT | MISCELLANEOUS<br>WORK | ABSENT/<br>RETURNED HOME |
|---|---|---|---|---|
| IMAGE | 5 | 4 | 2 | 1 |
| VOICE | 5 | 1 | 2 | 1 |
| SCREEN | 5 | 5 | 2 | 1 |

FIG. 24

| RULE | CONDITION |
|---|---|
| TIME CARD INDICATES RETURNING TO HOME. | RETURNED HOME |
| CONTINUATION OF VOICE AT A PREDETERMINED LEVEL OR HIGHER | HAVING VISITOR/MEETING |
| FREQUENT FILE ACCESSES | PREPARING A DOCUMENT |
| OTHERS | MISCELLANEOUS WORK |

FIG. 25

| TIME | SCHEDULE |
|---|---|
| 10:00 ~ 12:00 | MEETING |
| 13:00 ~ 15:00 | PREPARING A DOCUMENT |
| 15:00 ~ 17:00 | MEETING |
| 17:00 ~ | RETURNED HOME |

FIG. 26

| MEDIUM \ SCHEDULE | 10:00 ~ 12:00 MEETING | 13:00 ~ 15:00 PREPARING A DOCUMENT | 15:00 ~ 17:00 MEETING | 17:00 ~ RETURNED HOME |
|---|---|---|---|---|
| IMAGE | 5 | 4 | 5 | 1 |
| VOICE | 5 | 1 | 5 | 1 |
| SCREEN | 5 | 5 | 5 | 1 |

FIG. 28

| GROUP NAME | MEMBERS |
|---|---|
| G24 | A, C |
| G25 | C, D, E |
| MMM | A, B, C, D |
| ABC CIRCLE | A, B, C |

FIG. 29

| MEDIUM \ SENDER | MR. A | MR. B | MR. C | MR. D | MR. E |
|---|---|---|---|---|---|
| IMAGE | 4 | 3 | 5 | 2 | 3 |
| VOICE | 4 | 3 | 5 | 1 | 2 |
| SCREEN | 4 | 3 | 5 | 2 | 4 |

COMMUNICATION APPARATUS ALLOWING A RECEIVER TO RECOGNIZE A GENERALIZED SITUATION OF A SENDER

This is a continuation of application Ser. No. 08/373,447, filed Jan. 17, 1995 now abandoned.

FIELD OF THE INVENTION

The present invention relates to a communication apparatus having means for enabling recognition of the situation of a party to communicate with at a stage prior to starting a communication, for instance.

DESCRIPTION OF THE RELATED ART

Techniques for assisting communication between persons in distant locations are conventionally known. It goes without saying that the most fundamental of these techniques is the telephone system for transmitting voice data to distant locations. Furthermore, in recent years, video conference systems for connecting distant locations through time-varying images and voice have also been put to commercial use. In addition, in VideoDraw (Document [1]), TeamWorkstation (Documents [2], [3], [4], and [5]) and the like, not only the facial images of the other party but also the movement of the other party's hands, the manner in which the other party is writing on a piece of paper, the manner in which a computer screen is being operated, and so on can be shared by the users in distant locations to effect communication. Additionally, techniques for transmitting computer screens to distant locations have also been announced. For example, in MERMAID (Documents [6] and [7]), ASSOCIA [Documents [8], [9], and [10]), and the like, the participants are able to hold a common window and share the computer screen.

Next, a number of techniques have been announced whereby the situation in which the party to communicate with is placed can be ascertained at a stage prior to starting communication. These techniques include EuroPARC's IIIF (Integrated Interactive Intermedia Facility) (Document [12]), CAVECAT of University of Toronto (Document [11]), and the like. These are basically video conference systems using video circuits, and are provided with the function of supporting a stage prior to starting communication. In the case if IIIF, a function called "Glance" is provided to allow the situation of the other party only for a short time. By virtue of this function, it is possible to start communication after ascertaining the situation in which the other party is placed. In CAVECAT, a change in the form of an icon of a door can be transmitted to another party to indicate one's own present condition. The door icon can be set in four stages including "open," "semi-open," "closed," and "locked." When "open," it indicates that communication is possible at any time. When "semi-open," it indicates that the situation may be glanced at through the video circuit. When "closed," it indicates that communication is basically not allowed. When "locked," it indicates that communication is absolutely impossible. By viewing the door icon, it is possible to start communication after ascertaining the condition of the other party.

Document [1]: Tang, John C. and Minneman, Scott L.: "VideoDraw: A Video Interface for Collaborative Drawing," ACM Transactions on Information Systems, Vol. 9, No. 2, April 1991, pp. 170–184.

Document [2]: Yutaka Ishii: "Toward an Open Collaboration Media," Information Media of Information Processing Society of Japan, 3-2, September 1991, pp. 1–8.

Document [3]: Japanese Patent Application Laid-Open No. 3-119476 (NTT) "Shared Screen Control System"

Document [4]: Japanese Patent Application Laid-Open No. 3-119477 (NTT) "Shared Screen Control System"

Document [5]: Japanese Patent Application Laid-Open No. 3-119478 (NTT) "Shared Screen Control System"

Document [6]: Kazuo Watabe, Shiro Sakata, Kazutoshi Maeno, Hideyuki Fukuoka, and Toyoko Ohmori: "Multimedia Desktop Conferencing System: MERMAID," Transactions of Information Processing Society of Japan, Vol. 32, No. 9, September 1991, pp. 1200–1209.

Document [7]: Japanese Patent Application Laid-Open No. 3-58658 (NEC) "Desktop Conference System"

Document [8]: Yoshiyuki Nakayama, Kenjiroo Mori, Fumio Nakamura, Tadashi Yamamitsu: "A Computer-Supported Multiparticipant Teledialogue System: ASSOCIA," Transactions of Information Processing Society of Japan, Vol. 32, No. 9, September 1991, pp. 1190–1199.

Document [9]: Japanese Patent Application Laid-Open No. 2-84860 (Hitachi) "Method and System for Interactive Communication"

Document [10]: Japanese Patent Application Laid-Open No. 3-157029 (Hitachi) "Data Processing Apparatus"

Document [11]: Buxton, Bill, and Moran, Tom, "EuroPARC's Integrated Interactive Intermedia Facility (IIIF): Early Experiences," In Multi-User Interfaces and Applications, Gibbs, Simon and Verrijin-Stuart, Alex A. (Eds.), 1990, pp. 11–34.

Document [12]: Mantei, Marilyn, "Audio Video Enhanced Collaboration And Telepresence," FRIEND 21 '91 International Symposium on Next Generation Human Interface, Nov. 25–27, 1991, pp. 1–9.

The conventional techniques for assisting communication with a distant location by the transmission of moving images as in VideoDraw (Document [1]) and TeamWorkstation (Documents [2], [3], [4], and [5]), techniques, typified by the telephone system, for assisting communication with a distant location by voice, and techniques for assisting communication with a distant location by the transmission of a computer screen as in MERMAID (Documents [6] and [7]) and ASSOCIA (Documents [8], [9], and [10]), are designed to assist activities after the starting of the communication. For this reason, when communication is started, it has been necessary to take a method of establishing a communication channel after the other party is called by means of a bell or the like. Since the calling party cannot know the situation of the other party, the calling party is unable to start communication at an appropriate timing by taking the other party's condition into consideration. On the other hand, there has been a problem in that the called party may be called abruptly and his or her work may be interrupted no matter how important work he or she may be engaged in or even if he or she may be having an important visitor.

With respect to this problem, in IIIF (Document [11]), a measure is provided to allow the situation of the other party to be viewed temporarily by using the function called "Glance." This makes it possible for the calling party to start communication after viewing the situation of the other party. This method, however, has two problems. The first problem is that of privacy. The fact that the situation of the called party can be "glanced at" on the basis of sheer moving-image information even for a brief period gives the party "being glanced at" a sensation that he or she is being constantly monitored by someone. The second problem is that it is impossible to ascertain the flow of time. Even if the present condition is momentarily "glanced at," it is impossible to know what the other party had been doing up until then. Even if the called party is displayed working in the same manner, it is difficult to determine whether the called party has been continuously engaged in work in a concentrated manner and it is therefore advisable not to request communication, or whether the called party has started working just now and the request can be made. Even in cases where the other party is not on the screen, it is impossible to ascertain whether he or she has been away from his or her desk just for a while, or whether he or she is away for a much longer period of time due to a meeting or the like.

In CAVECAT (Document [12]), a measure is provided to let one's condition known by setting the present condition of one's own and transmitting the same to another party. This makes it possible for one party to ascertain the situation of the other party without infringing upon the privacy of the other party. This method also has two problems. The first problem is that of the complexity of the operation involved. It is a very troublesome operation to provide, before starting various kinds of work, settings as to whether or not to allow another party to make a request for communication in the midst of such work. In addition, as is also pointed out in the paper, the party frequently forgets to clear the setting on each occasion of the end of his or her work. The second problem is that the flow of time cannot be ascertained in the same way as with IIIF. Even if one's condition is set and is transmitted to the other party, it is impossible to ascertain changes in the condition of other party as the time flows.

SUMMARY OF THE INVENTION

Accordingly, it is an object of the present invention to enable recognition of a general condition, including its change over time, of a party to communicate with at a stage prior to starting a communication, without infringing the privacy of the party or requesting the party to conduct any special, cumbersome operation.

Another object of the present invention is to dynamically change the degree of presenting the general condition, considering the fact that the extent to which a general condition of a party to communicate with should be known or the degree to which the party's situation is allowed to be disclosed greatly varies depending on the party or its situation.

As a basic configuration, the communication apparatus in accordance with the present invention comprises:

a transmitting section (1) including situation-data input means (1a, 1b, 1c) for inputting data for representing a situation of another party and transmitting-section communication controlling means (1f) for transmitting the situation data from the situation-data input means;

a receiving section (2) including output means (2e, 2f, 2g) for outputting the situation of the other party and receiving-section communication controlling means (2d) for receiving the data from the transmitting section;

a network (3) for connecting the transmitting section and the receiving section; and general-condition-data generating means (1d) for generating data representing a general condition of the other party, i.e., general-condition data, on the basis of the data representing the situation of the other party.

In addition, the communication apparatus of the present invention further comprises, in addition to the above-described basic configuration, storage means (1e, 2b) for storing the data from the general-condition-data generating means.

In the above-described configuration, the communication apparatus of the present invention further comprises output controlling means (2a) for controlling a form of output by the output means.

In accordance with one aspect of the present invention, the output controlling means has synchronizing means (2a1) for synchronously outputting a plurality of kinds of data for representing the general condition of the other party.

In accordance with another aspect of the present invention, the output controlling means effects control for consecutively outputting the data for representing the general condition of the other party stored in the storage means.

In accordance with still another aspect of the present invention, the output controlling means effects control for collectively outputting the data for representing the general condition of the other party stored in the storage means.

In accordance with a further aspect of the present invention, the output controlling means effects control for consecutively outputting the data for representing the general condition of the other party stored in the storage means and for outputting a result of synthesis of output results.

In accordance with a still further aspect of the present invention, the communication apparatus of the present invention further comprises: level determining means for determining a degree of generalization (hereinafter referred to as a generalization level) when the data for representing the general condition is generated by generalizing the situation data by the general-condition-data generating means.

In accordance with a further aspect of the present invention, the level determining means includes generalization-level designating means (121c) for designating the generalization level, generalization-level storage means (123c) for storing generalization levels, and generalization-level controlling means (121g) for determining the generalization level by referring to the generalization-level storage means on the basis of the designation by the generalization-level designating means.

In accordance with a further aspect of the present invention, the level determining means includes receiver-name input means (122f) for designating the name of a receiver who requested presentation of information, storage means (123d) for storing a generalization level set in advance for each receiver, and the generalization-level controlling means (121g) for determining the generalization level for the receiver designated by the receiver-name input means by referring to the generalization level stored in the storage means.

In accordance with a further aspect of the present invention, the level determining means includes designating means (122g, 122h) for designating one or a plurality of senders or a sender group, storage means (123h) for storing the generalization level set in advance to each sender, and the generalization-level controlling means (121g) for determining the generalization level corresponding to each of the senders or the members of the sender group designated by the designating means, wherein the receiving section has output controlling means (122a) for effecting control for displaying the general-condition data of each of the designated senders in a predetermined form.

In accordance with a further aspect of the present invention, the level determining means includes condition input means (121b, 121a, 121f, 123g) for inputting the condition of the sender, level storage means (123f) for storing the generalization level set in advance for each condition, and the generalization-level controlling means (121g) for determining the generalization level corresponding to the condition inputted by the condition input means by referring to the generalization level stored in the storage means.

In accordance with a further aspect of the present invention, the communication apparatus of the present invention further comprises general-condition-data generation changeover means (121e) for selecting whether or not to use the general-condition-data generating means.

In accordance with a further aspect of the present invention, there is provided a communication apparatus for receiving environmental information on a transmitting section through a network and for recognizing by a receiving section the environment of the transmitting section on the basis of the received environmental information, the communication apparatus comprising:

- means for inputting the environmental information on the transmitting section;
- requesting means provided in the receiving section for requesting the environmental information to a particular one of transmitting sections;
- means for generating general-condition data on the environmental information concerning the particular transmitting section in response to the request by the receiving section to the particular transmitting section; and
- means for outputting the general-condition data received by the receiving section.

In accordance with a further aspect of the present invention, there is provided a communication apparatus for receiving environmental information on a transmitting section through a network and for recognizing by a receiving section the environment of the transmitting section on the basis of the received environmental information, the communication apparatus comprising:

- means for inputting the environmental information on the transmitting section;
- means for setting a disclosure-permitting level which is permitted to another party by the transmitting section with respect to the environmental information of the transmitting section;
- means for storing the disclosure-permitting level of the transmitting section set by the level setting means;
- requesting means provided in the receiving section for requesting the environmental information to a particular one of transmitting sections;
- means for generating general-condition data on the environmental information of the particular transmitting section on the basis of the permitted disclosure-permitting level of the particular transmitting section stored in the storage means, in response to the request by the receiving section to the particular transmitting section; and
- means for outputting the general-condition data received by the receiving section.

In accordance with a further aspect of the present invention, in the above-described configuration of the communication apparatus, the general-condition-data generating means generates the general-condition data in which the environmental information of the particular transmitting section is thinned out.

In accordance with a further aspect of the present invention, in the above-described configuration of the communication apparatus, the general-condition-data generating means generates the general-condition data by mixing noise into the environmental information of the particular transmitting section.

In accordance with a further aspect of the present invention, in the above-described configuration of the communication apparatus, the transmitting section is provided with changeover means for changing over the general-condition data or the data from the input means so as to transmit the same to communication controlling means of the receiving section.

The "environmental information" referred to herein and in the appended claims includes at least one of screen information of a terminal of the transmitting section, voice information at a certain location of the transmitting section, video information at a certain location of the transmitting section, and means information representing the situation of the transmitting section.

In operation, the situation data inputted from the situation-data input means (1a, 1b, 1c, 121d) is provided with generalization processing by general-condition-data generating means (121h), and is presented to the output means (2e, 2f, 2g) through the transmitting-section communication controlling means (1f, 121i), the network (2, 24), and the receiving-section communication controlling means (2d, 121c). Since the data representing the general condition of the other party is generated by the general-condition-data generating means on the basis of the situation data, it becomes impossible to perceive a detailed situation of the other party although it is possible to ascertain a rough situation of the other party. Accordingly, in the present invention, it becomes possible to ascertain the other party without infringing upon the privacy of the other party.

In addition, the output information from the general-condition-data generating means is stored in the storage means (1e, 2b). Consequently, it becomes possible to follow changes over time in the situation of the other party.

Furthermore, the output controlling means is capable of controlling an output form for outputting by the output means (2e, 2f, 2g). With respect to a plurality of kinds of data, the plurality of kinds of data are synchronized by the synchronizing means (2a1). Consequently, it becomes possible to assess the situation of the other party from a multiplicity of angles on the basis of the plurality of kinds of data.

In a case where the output form is arranged such that changes over time in the situation of the other party are consecutively outputted chronologically, it is readily possible to ascertain and understand the changes over time in the situation of the other party.

In addition, in a case where the output form is arranged such that changes over time in the situation of the other party are outputted at one time, it is possible to ascertain at one time the changes over time in the situation of the other party.

Furthermore, in a case where the output form is arranged such that changes over time in the situation of the other party are consecutively outputted chronologically, and the output results are superposed one on top of another, in addition to the advantage that it is easy to ascertain and understand the changes over time in the situation of the other party, there is an advantage in that the situation can be ascertained at one time from a final output result.

In the communication apparatus of the present invention, the level determining means (121g) determines the generalization level, and the general-condition-data generating means (121h) generates the general-condition data at the determined generalization level. Accordingly, the degree of transmitting the general condition of the transmitting section can be varied by the level determining means.

In the communication apparatus of the present invention, the generalization-level designating means (121c) accepts a designation by a user, and transmits the generalization level desired by the user to the generalization-level controlling means (121g). The generalization-level controlling means sets the generalization level of the data to be generated by the general-condition-data setting means, on the basis of the data stored in the generalization-level storage means (123c). Consequently, it becomes possible to set an optimum generalization level for the user. Incidentally, if receiver-minimum-level storage means (123e) for storing a minimum generalization level allowed to each receiver is provided, in the event that the generalization level is changed by the generalization-level designating means (121c), it is possible to provide control such that the generalization level will not be set at a lower level than the allowed level, by retrieving the receiver-minimum-level storage means (123e). Thus, it is possible to prevent the provision of information at a level lower than the generalization level allowed to that receiver (i.e., information of high quality).

In the communication apparatus of the present invention, on the basis of the name of the transmitting section inputted from the receiver-name input means (122f), retrieval is made in the receiver-level storage means (123d), the generalization level of the receiver is automatically set, and is transmitted to the generalization-level controlling means (121g). The generalization-level controlling means (121g) controls the general-condition-data generating means (121h) to provide the general-condition data. Consequently, it becomes possible to present the general condition at a generalization level determined in advance for each receiver.

In the communication apparatus of the present invention, the receiver designates one or a plurality of senders by the designating means (122g, 122f, 122h). If one sender is designated, on the basis of the designated sender, retrieval is effected in the sender-level storage means (123h), and the generalization level allotted to that sender is transmitted to the generalization-level controlling means (121g). The generalization-level controlling means (121g) controls the general-condition-data generating means (121h) to provide the general-condition data. Consequently, in a case where the situation data on a particular sender among a plurality of senders is viewed, it becomes possible to automatically designate the generalization level.

In a case where the receiver designates a plurality of senders by the designating means (122g), on the basis of the designated senders, retrieval is effected in the storage means (123h), and the generalization levels allotted to the respective senders are transmitted to the generalization-level controlling means (121g). The generalization-level controlling means (121g) controls the general-condition-data generating means (121h) to provide the general-condition data. Finally, the output controlling means (122a) synthesizes the general-condition data, and provides the same to output means (122c). Consequently, it becomes possible to ascertain the general conditions of a plurality of senders at appropriate generalization levels.

In a case where a sender group is designated, the receiver designates the group whose general condition the receiver wishes to know, by means of the designating means (122h). The group name is retrieved from group-data storage means (123i), to obtain information on group members. Furthermore, retrieval is made in the sender-level storage means (123h) on the basis of the information on the group members, so as to obtain the generalization levels for the respective members. These generalization levels are transmitted to the generalization-level controlling means (121g) of the respective senders. The generalization-level controlling means (121g) controls the general-condition-data generating means (121h) to provide the general-condition data. Finally, the output controlling means (122a) synthesizes the general-condition data, and provides the same to output means 122c. Consequently, it becomes possible to ascertain the general conditions of a plurality of senders (group members) at appropriate generalization levels by designating the group.

In the communication apparatus of the present invention, on the basis of the condition of the sender inputted from the condition input means (121b, 121a, 121f, 123g), retrieval is effected in the storage means (123f), and the generalization level designated for that condition is transmitted to the generalization-level controlling means (121g). The generalization-level controlling means (121g) controls the general-condition-data generating means (121h) to provide the general-condition data. Consequently, it becomes possible to provide the general-condition data at an appropriate generalization level in the condition in which the sender is placed.

In a case where the input of the condition of the sender is detected automatically, the data detected by the condition detecting means (121a) is analyzed on the basis of rules stored in the condition-detecting-rule storage means (121f), so as to estimate the condition in which the sender is presently placed. On the basis of this estimated data, retrieval is effected in the storage means (122f), and the generalization level designated for that condition is transmitted to the generalization-level controlling means (121g). The generalization-level controlling means (121g) controls the general-condition-data generating means (121h) to provide the general-condition data. Consequently, it becomes possible to automatically assess the condition in which the sender is placed, and to provide the general-condition data at a generalization level appropriate for that condition.

For example, an arrangement can be provided such that the condition of the sender is ascertained from the schedule of the sender. In this case, retrieval is effected in the schedule storage means (123g) in which the schedule of the sender is stored, so as to estimate the condition in which the sender is present placed. On the basis of this estimated data, retrieval is effected in the condition-level storage means (123f), and the generalization level designated for that condition is transmitted to the generalization-level controlling means (121g). The generalization-level controlling means (121g) controls the general-condition-data generating means (121h) to provide the general-condition data. Consequently, it becomes possible to automatically assess the condition in which the sender is placed, and to provide the general-condition data at a generalization level appropriate for that condition.

In the communication apparatus of the present invention, the general-condition-data generation changeover means (121e) accepts a designation by the user, and effects a changeover as to whether or not the generalization processing by the general-condition-data generating means (121h) is to be carried out. Consequently, it becomes possible to effect communication while performing a changeover between ordinary communication and communication for transmitting a general condition.

BRIEF DESCRIPTION OF THE DRAWINGS

FIG. 17 is a diagram illustrating an example of data which are stored in a generalization-level storage means;

FIG. 20 is a diagram illustrating an example of data which are stored in a receiver-level storage means;

FIG. 21 is a diagram illustrating an example of data which are stored in a receiver-minimum-level storage means;

FIG. 23 is a diagram illustrating an example of data which are stored in a condition-level storage means;

FIG. 24 is a diagram illustrating an example of data which are stored in a condition-detecting-rule storage means;

FIG. 25 is a diagram illustrating an example of data which are stored in a schedule storage means;

FIG. 26 is a diagram illustrating an example of generalization-level data generated by the schedule storage means;

FIG. 28 is a diagram illustrating an example of data which are stored in a group-data storage means;

FIG. 29 is a diagram illustrating an example of data which are stored in a sender-level storage means.

DESCRIPTION OF THE PREFERRED EMBODIMENTS

Referring now to the accompanying drawings, a detailed description will be made of the features of the present invention on the basis of the embodiments.

First Embodiment

Figure 1:
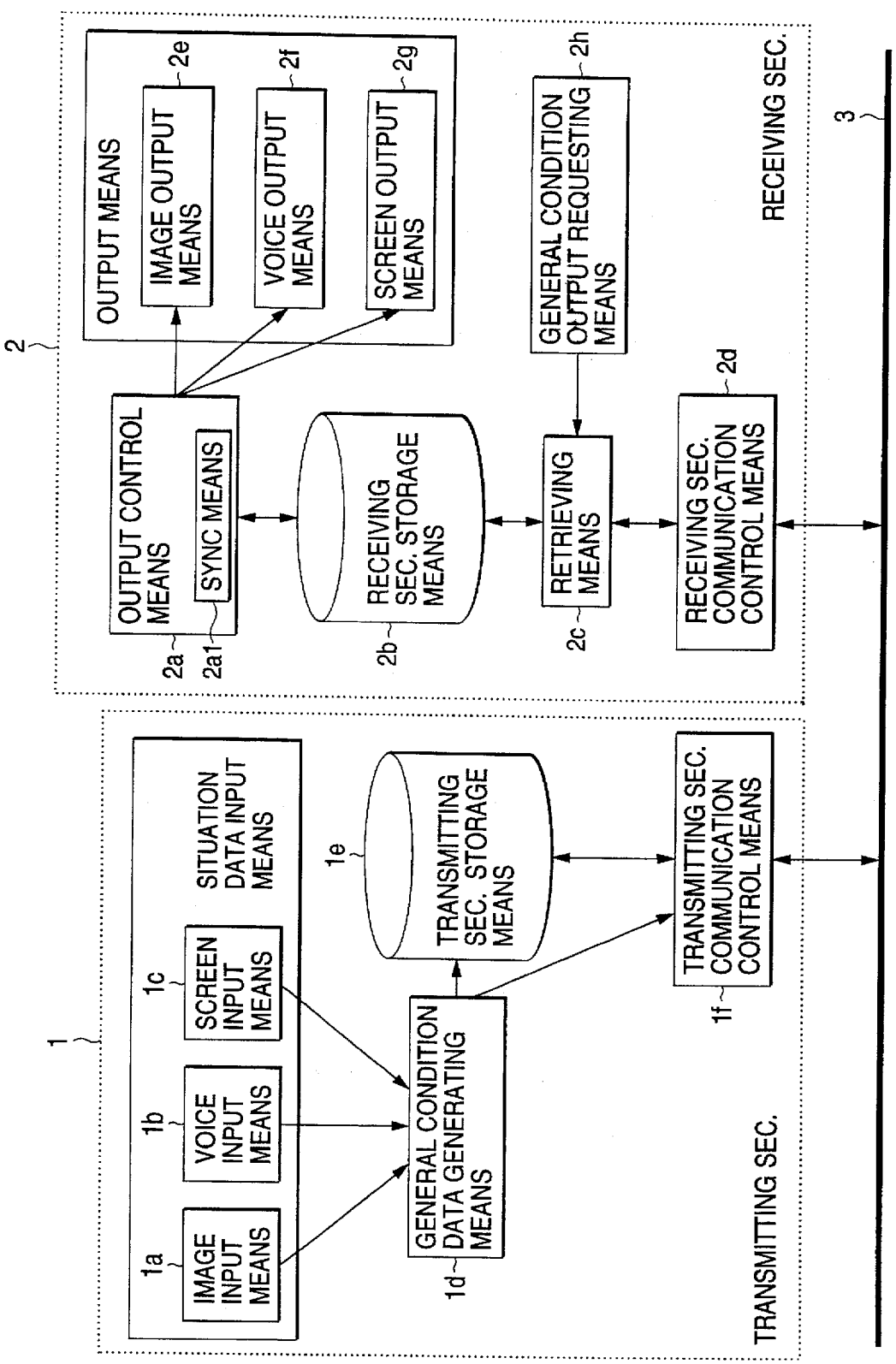
FIG. 1 is a block diagram illustrating a configuration for realizing the communication apparatus in accordance with the present invention.

FIG. 1 is a block diagram illustrating an overall configuration of a communication apparatus for carrying out the present invention.

This apparatus is comprised of a transmitting section 1 which includes an image input means 1a for inputting image data, a voice input means 1b for inputting voice data, a screen input means 1c for inputting data on a computer screen, a general-condition-data generating means 1d for generating data representing a general condition by generalizing (e.g., degrading) screen data, a transmitting-section storage means 1e for storing the general-condition data thus generated, and a transmitting-section communication control means 1f for exchanging data through a network; a receiving section 2 which includes a general-condition-output requesting means 2h for receiving a request for display from a user, a retrieving means 2c for retrieving data in the transmitting section 1 in accordance with a request, a receiving-section communication control means 2d for exchanging data through the network, a receiving-section storage means 2b for storing received data, an image output means 2e for displaying image data, a voice output means 2f for outputting voice, a screen output means 2g for displaying data on the computer screen, an output control means 2a for controlling the form of an output by each of these output means, and a synchronizing means 2a1 for synchronizing the respective data; and a network 3 for exchanging data between the transmitting section 1 and the receiving section 2.

Figure 2:
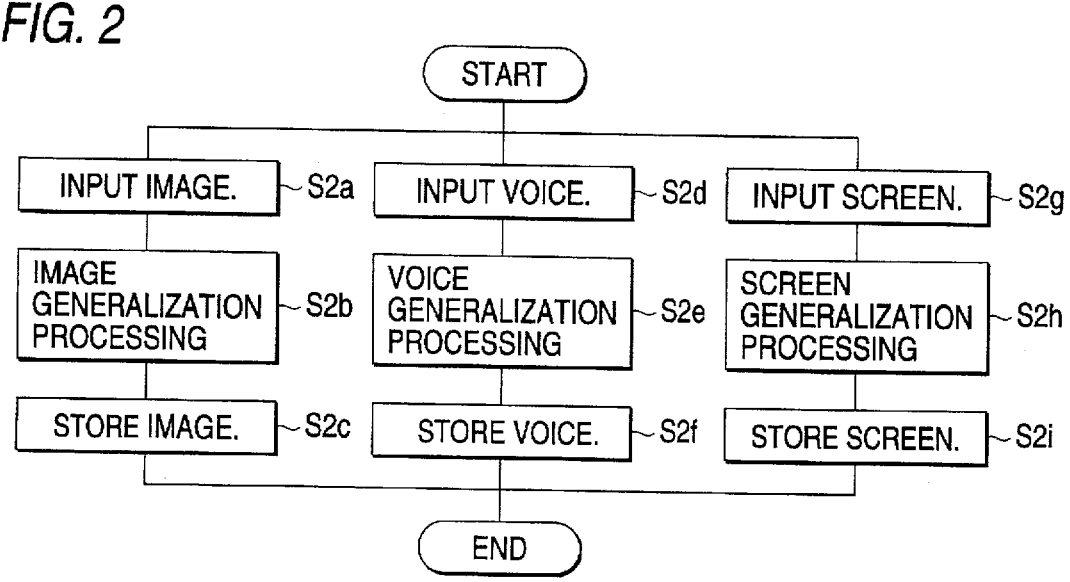
FIG. 2 is a flowchart illustrating processing by a transmitting section in accordance with a first embodiment of the present invention.

FIG. 2 is a flowchart illustrating the processing by the transmitting section 1 for providing information on the situation of the other party. Hereafter, a description will be made of the specific operation of the transmitting section 1 with reference to the flowchart shown in FIG. 2. In the transmitting section 1, image data, voice data, computer screen data are inputted thereto and are processed.

First, a description will be made of the flow of image data. The image data representing the situation of the other party is fetched into the apparatus by the image input means 1a typified by a television camera (Step S2a). Then, the data is transformed into general-condition data representing a general condition of the other party by the general-condition-data generating means 1d. In this embodiment, the general-condition data is generated by a method in which continuous time-varying images are thinned out. In this method, the fetched time-varying images are transmitted one at a time every several seconds, dozens of seconds, or several minutes. As a result, it becomes impossible to ascertain the detailed movement of the other party being shot. Although a description is given herein by using the method in which frames are thinned out, any method may be used as the method of generalizing images, insofar as it is capable of rendering the detailed movement or details of the images unperceptible, including a method in which pixels are thinned out, a method using quantization, a method in which a high-frequency component is cut off, a method in which unnecessary data is mixed in, a method in which color representation is changed, a method in which contrast is enhanced, and the like (Step S2b). The generalized image data is stored in the transmitting-section storage means. In this embodiment, since a description is given by using the method in which images are thinned out, images which are each shot, for example, for one second every one minute are stored in the form shown in FIG. 3 (Step S2c).

Next, a description will be made of the flow of voice data. The basic operation is utterly the same as with the image data. The voice data representing the situation of the other party is fetched into the apparatus by the voice input means 1b typified by a microphone (Step S2d). Next, the quality of the data is degraded by the general-condition-data generating means 1d. In this embodiment, a description will be given by a method in which continuous voice is thinned out. As a result, it becomes impossible to ascertain the details of the voice. As the method of generalizing (degrading) the voice, any method may be used insofar as it is capable of rendering the details of the voice unperceptible, such as a method in which noise is mixed in and a method in which particular frequencies are cut off (Step S2e). The generalized voice data is stored in the transmitting-section storage means. In this embodiment, since a description is given by using the method in which voice is thinned out, voice recorded for one second every one minute is stored in the form shown in FIG. 3 (Step S2f).

Next, a description will be made of the flow of screen data. The basic operation is utterly the same as with the image data and the voice data. The screen data representing the manner in which the other party operates the computer is fetched into the apparatus by the screen input means 1c by a method such as shooting the computer screen by a television camera, or fetching the data to be displayed on the computer display through the network (Step S2g). Then, the quality of the data is degraded by the general-condition-data generating means 1d. In this embodiment, a description will be given by using a method in which continuous images are thinned out. In this method, the fetched images are transmitted one at a time every several seconds, dozens of seconds, or several minutes. As a result, it becomes impossible to ascertain the detailed operation of the other party. As the method of generalizing the screen data, in the same way as with the generalization of the image data, any method may be used as the method of generalizing images, insofar as it is capable of rendering the detailed movement or details of the images unperceptible, including the method in which pixels are thinned out, the method using quantization, the method in which a high-frequency component is cut off, the method in which unnecessary data is mixed in, the method in which color representation is changed, the method in which contrast is enhanced, and the like (Step S2h). The generalized screen data whose quality is degraded is stored in the transmitting-section storage means. In this embodiment, since a description is given by using the method in which the screens are thinned out, screens which are each fetched, for example, for one second every one minute are stored in the form shown in FIG. 3 (Step S2i).

Figure 4:
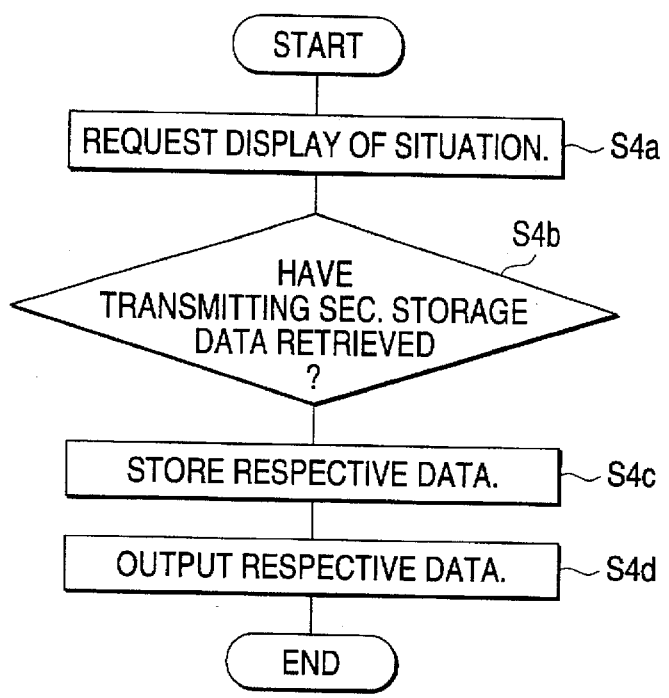
FIG. 4 is a flowchart illustrating processing by a receiving section in accordance with the first embodiment of the present invention.
Figure 5:
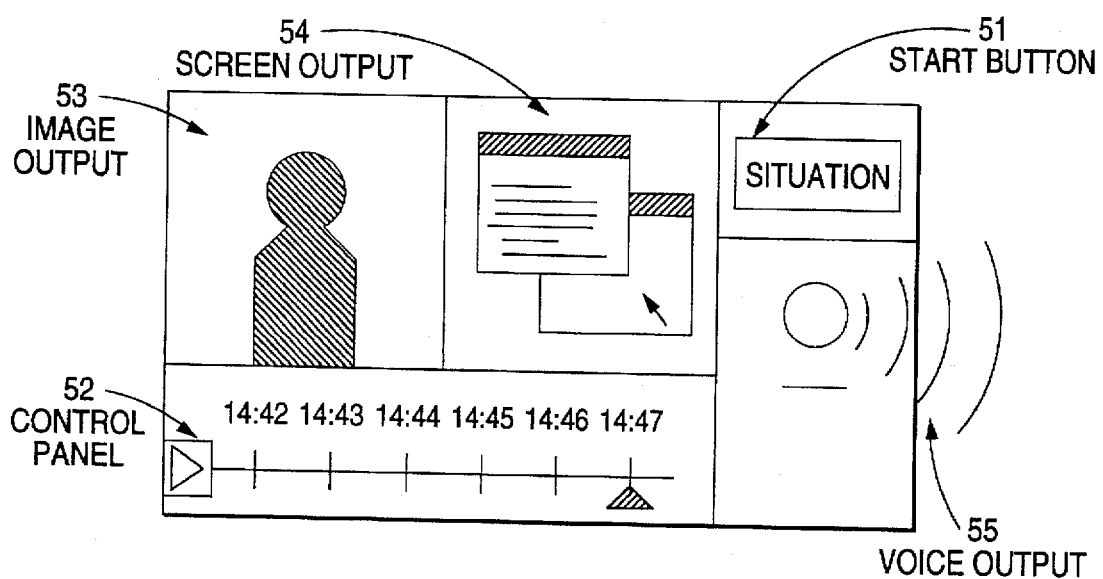
FIG. 5 is a diagram illustrating an example of the receiving section of the communication apparatus of the present invention.

FIG. 4 is a flowchart illustrating the processing by the receiving section 2 for displaying the general condition of the other party. Hereafter, a description will be made of specific processing with reference to the flowchart shown in FIG. 4. FIG. 5 is a diagram illustrating an example of the receiving section 2 of the communication apparatus.

By pressing a "start button" (i.e., a user interface portion of the general-condition-output requesting means 2h) shown in FIG. 5, the user transmits to the apparatus a request that he or she wants to know the situation of the other party (Step S4a). Upon receiving the request, the retrieving means 2c retrieves the image data, the voice data, and the screen data stored in the transmitting-section storage means through the receiving-section communication control means 2d, the network 3, and the transmitting-section communication control means 1f (Step S4b). The retrieved data are stored in the receiving-section storage means 2b through the transmitting-section communication control means 1f, the network 3, and the receiving-section communication control means 2d in forms similar to those shown in FIG. 5 (Step S4c). After the stored data are synchronized by the synchronizing means 2a1, the image data is outputted to the image output means 2e, the voice data is outputted to the voice output means 2f, and the screen data is outputted to the screen output means 2g(Step S4d).

Figure 6:
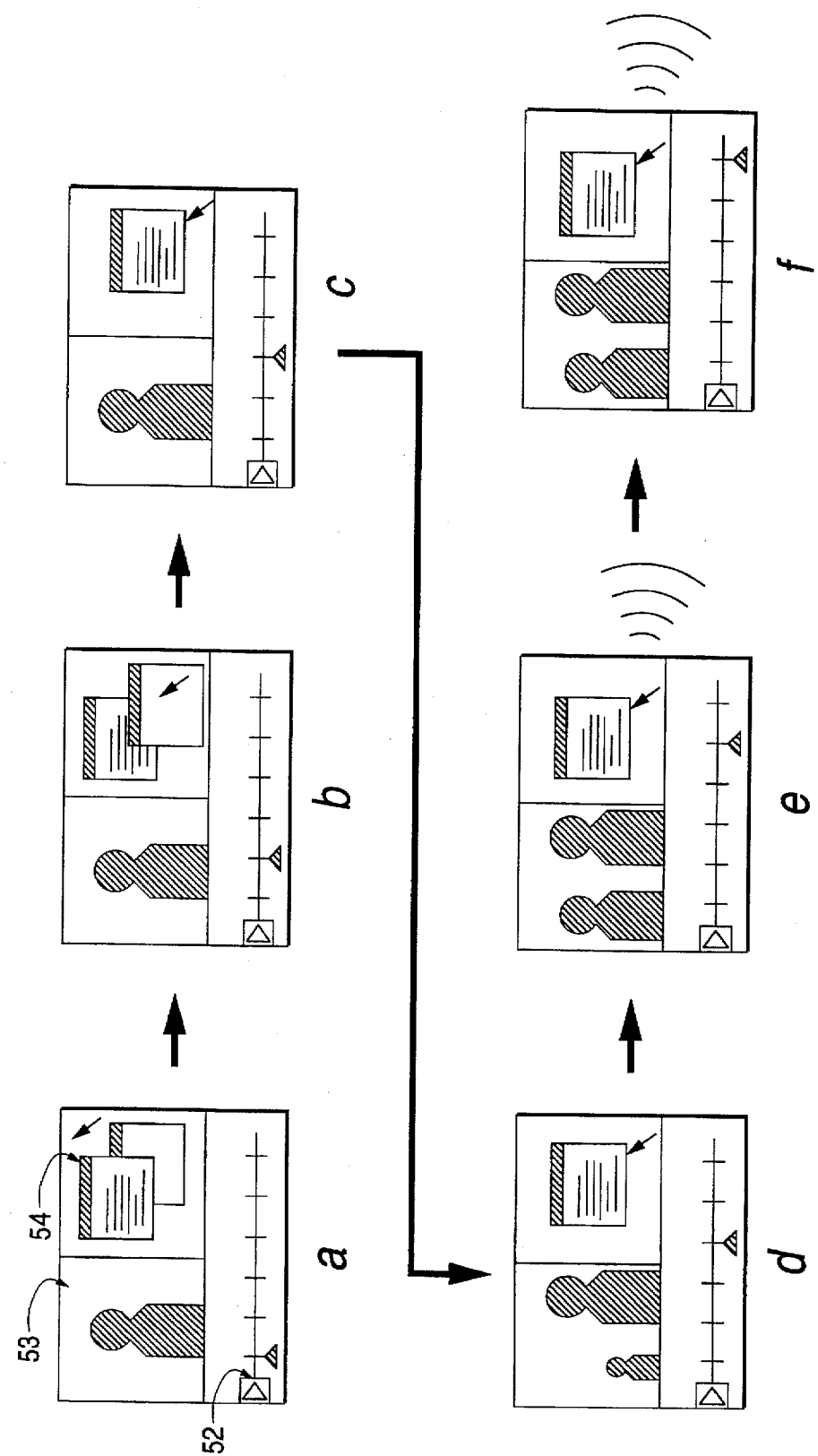
FIG. 6 is a diagram illustrating an example 1 of an output form in the present invention.

The parts a to f in FIG. 6 show an example in which when the image data, the voice data, and the screen data are outputted, the data representing the general condition of the other party, which are stored in the receiving-section storage means 2b, are consecutively outputted. In this example, the stored data are consecutively displayed chronologically. The way in which the time elapses is displayed on a control panel 52. By viewing an image output 53 and a screen output 54, it is possible to ascertain that the other party was engaged in work using a computer in stages a to c, and that the other party appears to have had a visitor at the stage d. In addition, as fragmentary voices are simultaneously reproduced at stages e to f, it is possible to ascertain that they are engaged in some conversation.

Figure 7:
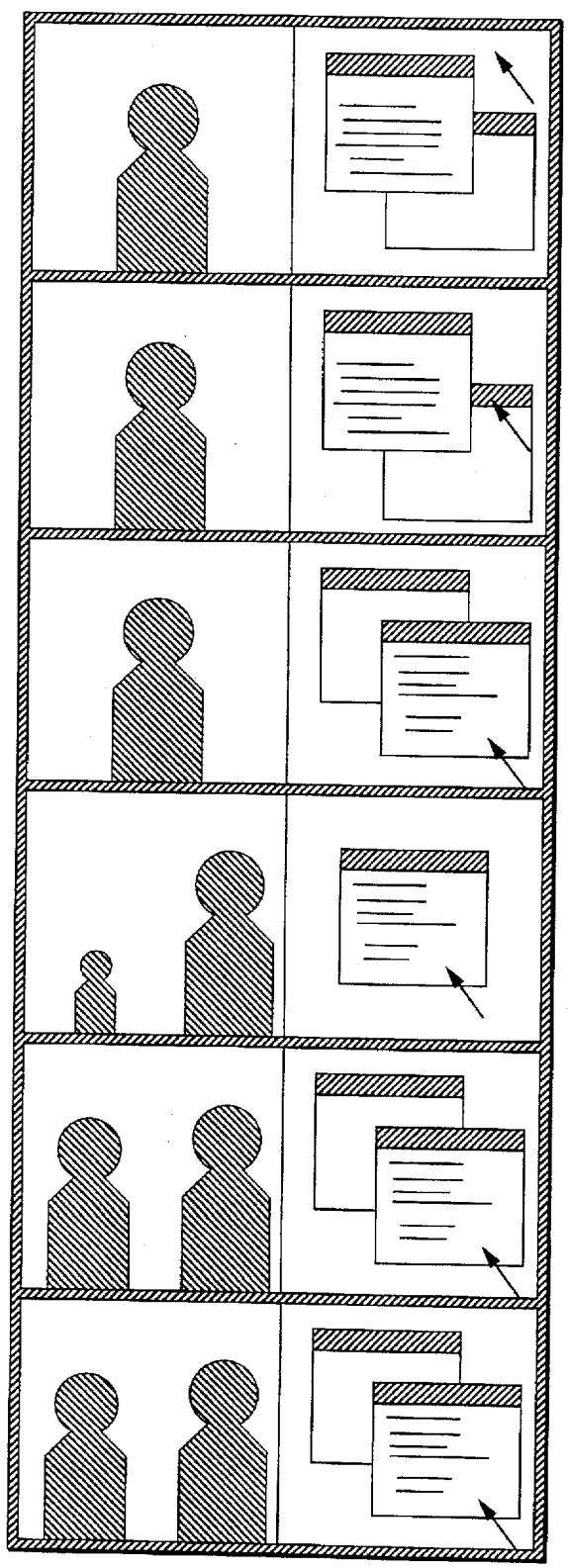
FIG. 7 is a diagram illustrating an example 2 of the output form in the present invention.

FIG. 7 shows an example in which when the image data and the screen data are outputted, the data representing the general condition of the other party, which are stored in the receiving-section storage means 2b, are outputted collectively. In this example, all the image outputs and screen outputs are displayed simultaneously. Consequently, it is possible to ascertain the situation of the other party at one time.

Figure 8:
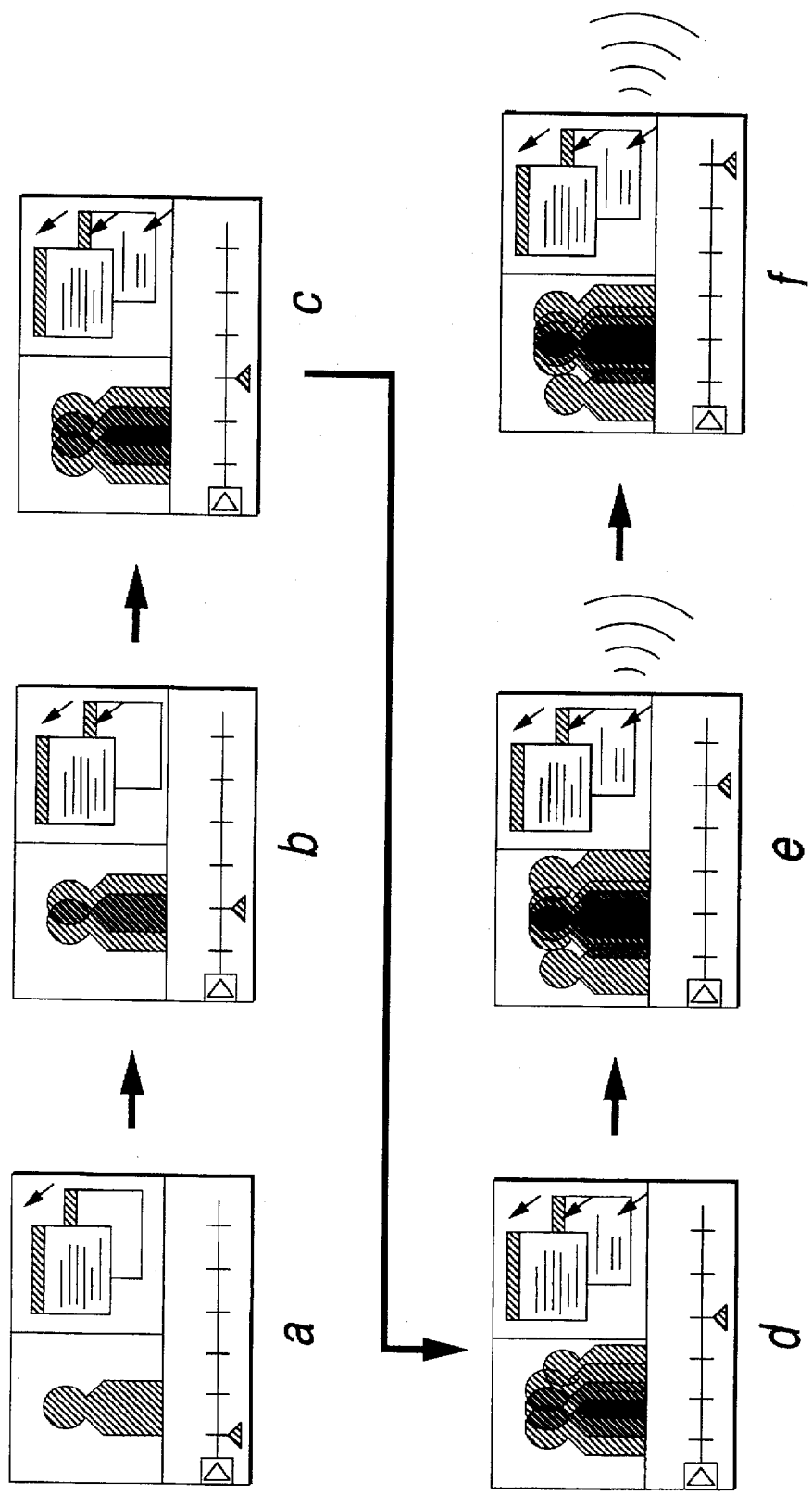
FIG. 8 is a diagram illustrating an example 3 of the output form in the present invention.

The parts a to f of FIG. 8 show an example in which when the image data, the voice data, and the screen data are outputted, the data representing the general condition of the other party, which are stored in the receiving-section storage means 2b, are consecutively outputted, and a result of synthesis of output results is outputted. In this example, an output method substantially similar to that of the example shown in FIG. 6 is used, but when the image data and the screen data are outputted with the lapse of time, the images are displayed by being overlapping with the former images. As a result, it is possible to obtain an advantage similar to that of the example shown in FIG. 6, and it is possible to ascertain the general condition of the other party by simply viewing the screen f. This can be realized by storing the images synthesized with the former images when the data are stored in Step S4c. Of course, this can also be realized by adding processing in which the images are synthesized when the data are outputted in Step S4d.

Second Embodiment

The difference between a second embodiment and the first embodiment lies in that the data are not stored in the transmitting-section storage means, and the data are directly transmitted to the receiving section 2. Accordingly, the second embodiment is configured by omitting the transmitting-section storage means in FIG. 1.

Figure 9:
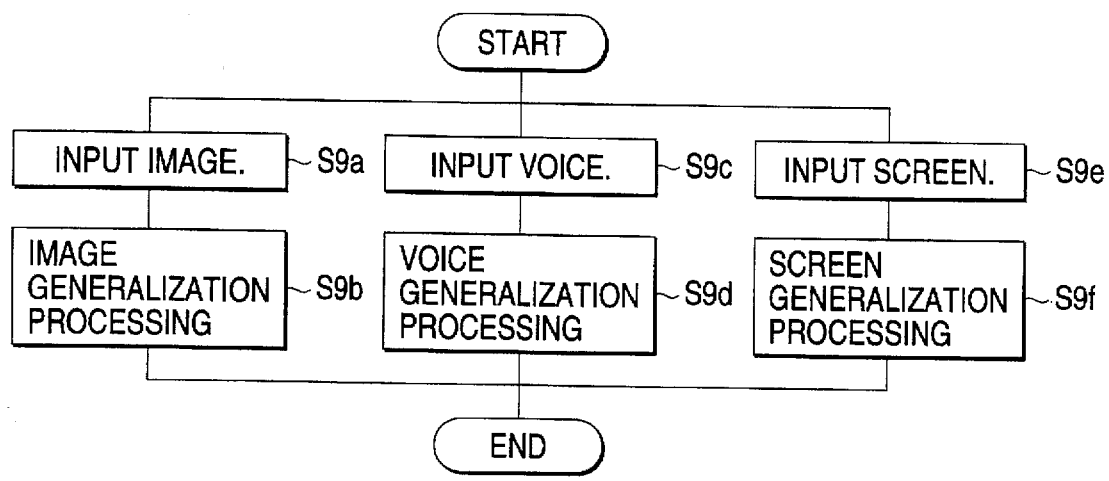
FIG. 9 is a flowchart illustrating processing by a transmitting section in accordance with a second embodiment of the present invention.

FIG. 9 is a flowchart illustrating the processing by the transmitting section 1 for providing information on the situation of the other party. Hereafter, a description will be made of specific processing with reference to the flowchart shown in FIG. 9.

First, a description will be made of the flow of the image data. The image data representing the situation of the other party is fetched into the apparatus by the image input means 1a typified by a television camera (Step S9a). Then, the image data is transformed into data representing a general condition of the image by the general-condition-data generating means 1d. In this embodiment, a description will be given by using the method in which continuous time-varying images are thinned out. In the same way as in the first embodiment, any method may be used insofar as it is capable of rendering the detailed movement or details of the images unperceptible (Step S9b).

The flows of voice data and screen data are also similar to those of the first embodiment except that storage is not carried out (Steps S9c, S9d, and Steps S9e, S9f).

Figure 10:
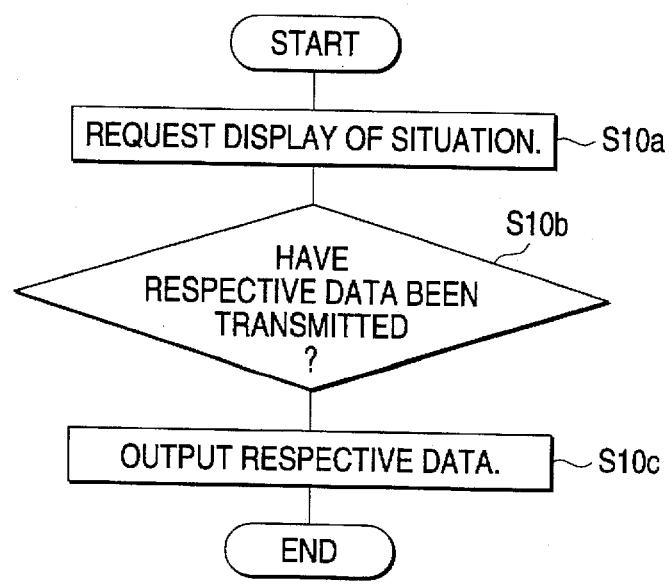
FIG. 10 is a flowchart illustrating processing by a receiving section in accordance with the second embodiment of the present invention.

FIG. 10 is a flowchart illustrating the processing by the receiving section 2 for displaying the general condition of the other party. Hereafter, a description will be made of specific processing with reference to the flowchart shown in FIG. 10.

By pressing the "start button," the user transmits to the apparatus a request that he or she wants to know the situation of the other party (Step S10a). Upon receiving the request, the retrieving means 2c obtains the image data, the voice data, and the screen data provided from the transmitting section 1 through the receiving-section communication control means 2d, the network 3, and the transmitting-section communication control means 1f. The respective data are transmitted to the receiving section 2 through the transmitting-section communication control means 1f, the network 3, and the receiving-section communication control means 2d (Step S10b). After the respective data are synchronized by the synchronizing means 2a1, the image data is outputted to the image output means 2e, the voice data is outputted to the voice output means 2f, and the screen data is outputted to the screen output means 2g (Step S10c).

Figure 11:
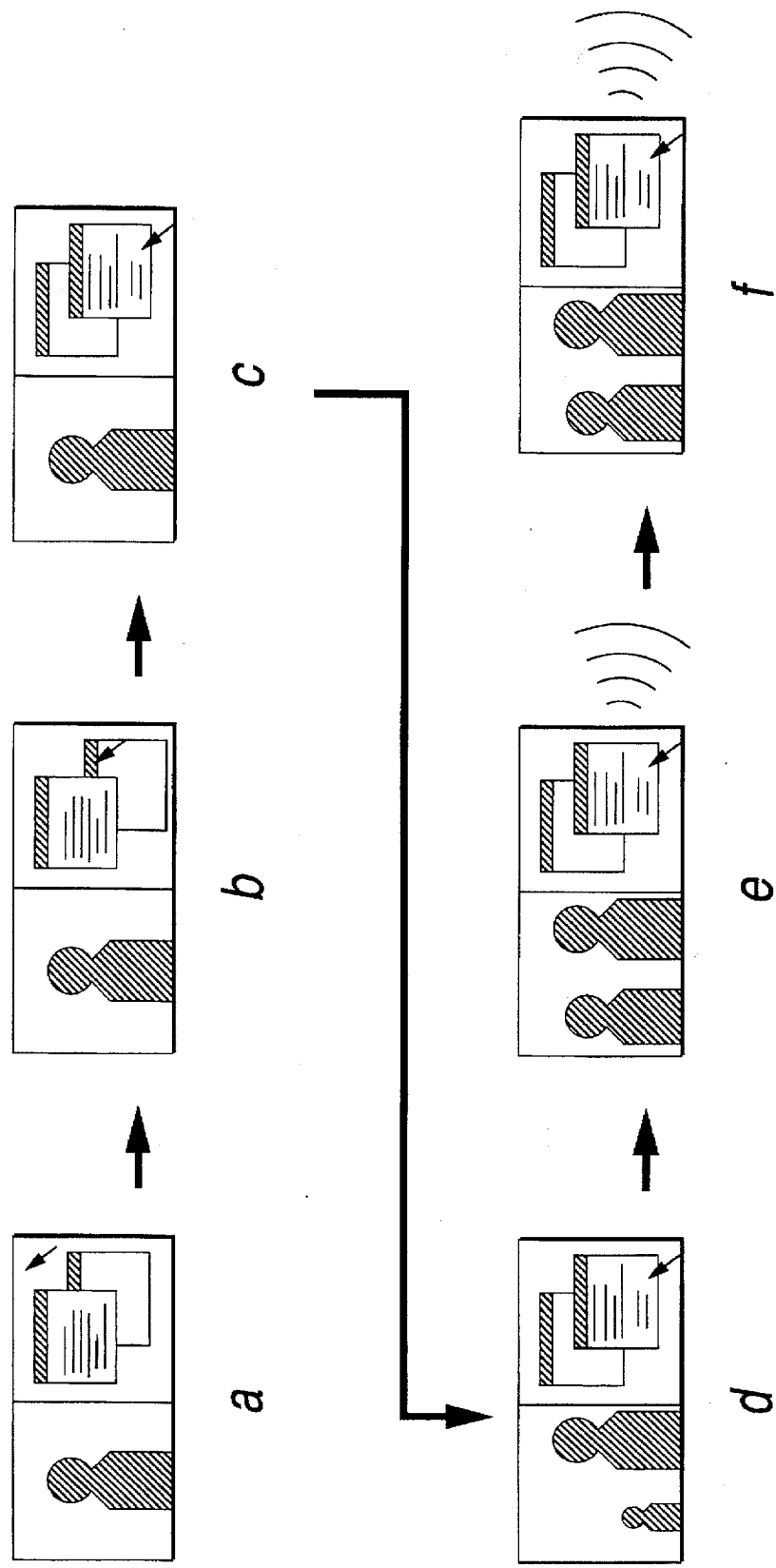
FIG. 11 is a diagram illustrating an example 4 of the output form in the present invention.

FIG. 11 shows an example in which the image data, the voice data, and the screen data are outputted. In this example, the respective data are displayed at the same time as they are provided from the transmitting section 1. In the case of the example in which the method of thinning out the data is used, the respective data are updated and outputted at fixed intervals of time.

Configuration of Third to Ninth Embodiments

Figure 12:
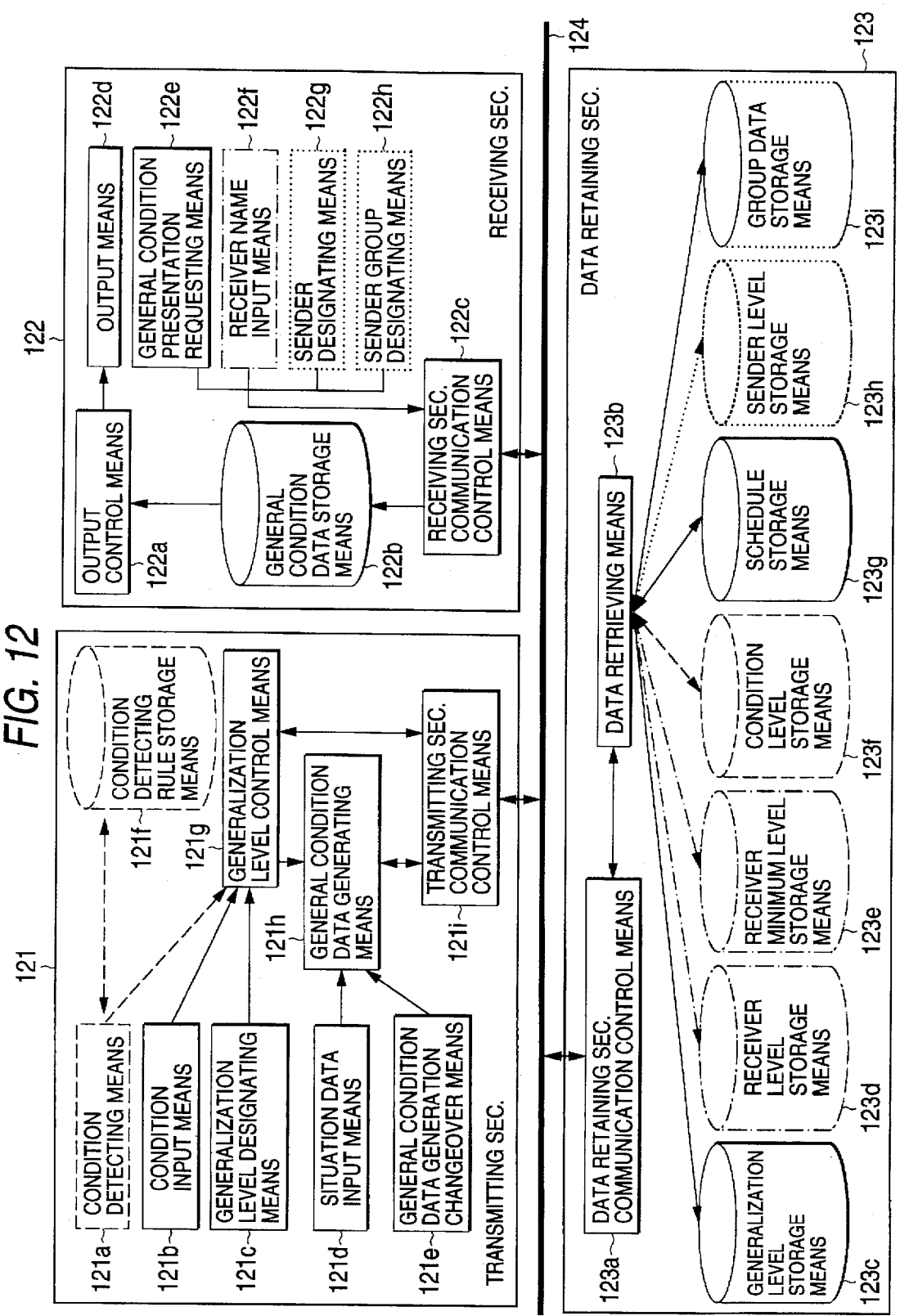
FIG. 12 is a block diagram illustrating a configuration of a communication apparatus in accordance with a third embodiment of the present invention.
Figure 13:
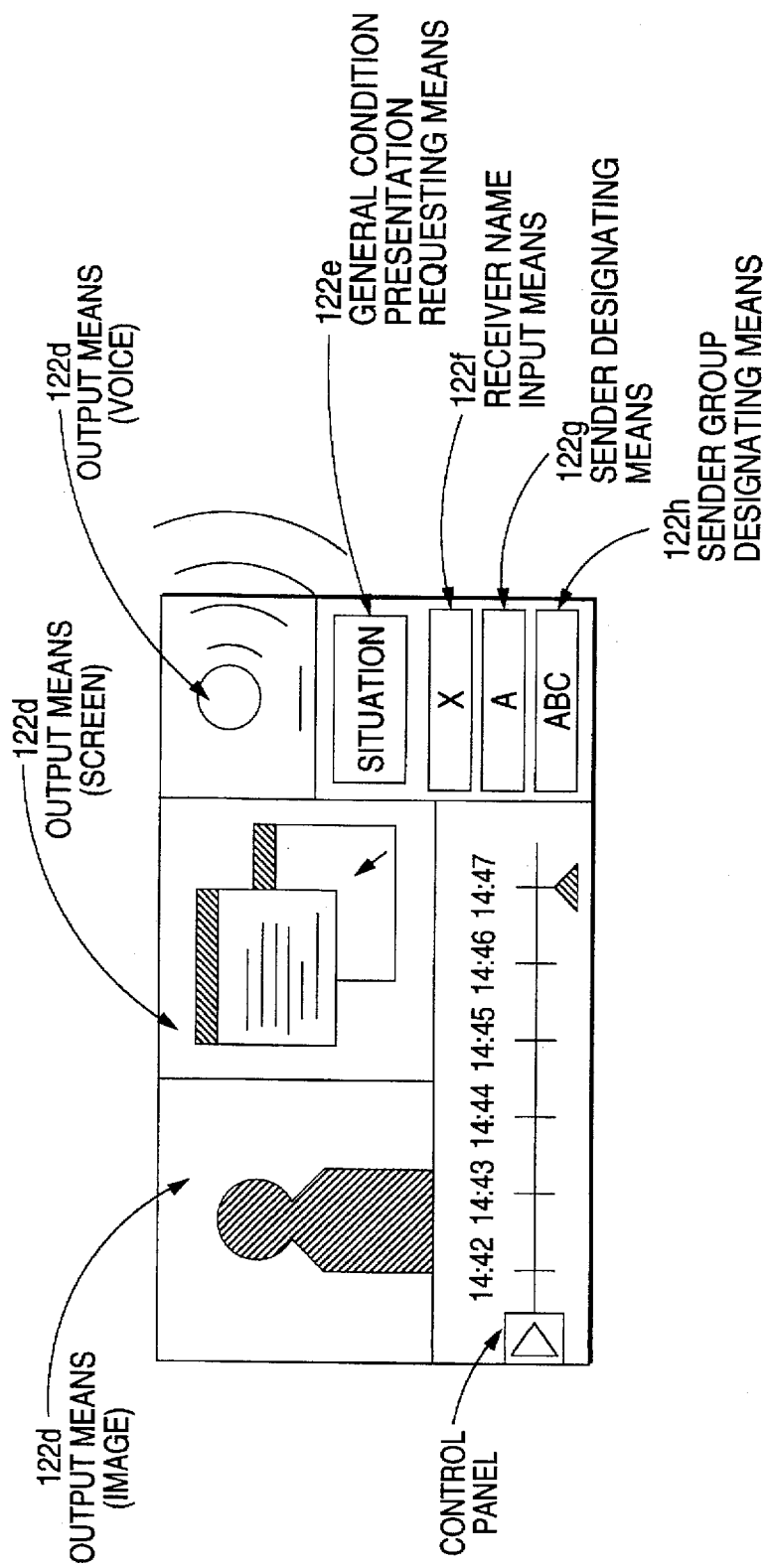
FIG. 13 is a diagram illustrating an example of the screen display of the receiving section of the communication apparatus.

FIG. 12 is a block diagram illustrating an overall configuration of the communication apparatus in accordance with third to ninth embodiments of the present invention. The main differences between these embodiments and the first embodiment lie in that a means for controlling the generalization levels of the general-condition-data generating means is provided, that a changeover means for using or not using the general-condition-data generating means, and that various data used for the above-described control are collectively managed by a data retaining section. Incidentally, in FIG. 12, although, as means for determining a generalization level, various forms (embodiments) are shown in mixed fashion, one of them or a combination of a number of them may be selected and used when the invention is carried out.

The "general-condition data" referred to in the embodiment shown in FIG. 12 means data on the environmental information of the transmitting section whose quality is degraded by thinning out the environmental information of the transmitting section in a predetermined range permitted by the transmitting section for disclosure to the receiving section.

The communication apparatus of this embodiment is comprised of a transmitting section 121 into which information representing a situation is inputted and which generates and transmits general-condition data, a receiving section 122 which receives and presents the general-condition data, a data retaining section 123 for retaining necessary data, and a network 124 for connecting the respective sections.

The transmitting section 121 includes a condition detecting means 121a for detecting the condition of a sender, a condition input means 121b for inputting the condition of the sender, a generalization-level designating means 121c for designating a generalization (degradation) level, a general-condition-data generation changeover means 121e for effecting a changeover for generating or not generating the general-condition data, a condition-detecting-rule storage means 121f for storing rules for estimating the condition on the basis of data from the condition detecting means 121a, and a general-condition-data generating means 121h for generating data representing the general condition of the other party on the basis of the data representing the situation of the other party.

On the other hand, the receiving section 122 includes a receiving-section communication control means 122c for receiving data from the transmitting section 121, a general-condition-data storage means 122b for storing the general-condition data, an output control means 122a for synthesizing the general-condition data from a plurality of senders, a general-condition presentation requesting means 122e, a receiver-name input means 122f, a sender designating means 122g, and a sender-group designating means 122h for designating a group which is to present the general-condition data. Incidentally, although in this embodiment a description will be given by using a method in which the general-condition data is stored in the general-condition-data storage means 122b, the basic processing is the same even in cases where the general-condition data is not stored.

In addition, the communication apparatus in this embodiment further comprises the data retaining section 123 which provides data in response to a request from the transmitting section 121 or the receiving section 122. The data retaining section 123 includes a data-retaining-section communication control means 123a for exchanging data with other sections, a data retrieving means 123b for retrieving a plurality of pieces of data stored in the data retaining section 123, a generalization-level storage means 123c for retaining data whereby a generalization-level control means 121g controls the general-condition-data generating means 121h, a receiver-level storage means 123d for storing the generalization level for each receiver, a receiver-minimum-level storage means 123e for storing a minimum generalization level allowed to a receiver, a condition-level storage means 123f for storing the generalization level corresponding to the condition of the sender, a schedule storage means 123g for storing the schedule of the sender, a sender-level storage means 123h for storing the generalization level for each sender, and a group-data storage means 123i for storing the data on the constituent members of a group. Although, in this embodiment, the data retaining section 123 is located at an independent position on the network, the data retaining section 123 may be located at any position if retrieval is possible from the transmitting section 121 or the receiving section 122.

It should be noted that there are various modes in the method of determining the generalization level so as to vary in a multiplicity of stages the generalization level, i.e., the rate of generalizing the general-condition data generated by the general-condition-data generating means 121h. For example, such modes in the method of determining the generalization level include (a) a method in which the user (sender or receiver) directly designates the generalization level, (b) a method in which, in response to a request to present the general-condition data, the generalization level allotted to the user (receiver) who made the presentation request is used, (c) a method in which, in response to a request to present the general-condition data, the generalization level allotted to the sender or senders subject to the presentation request is used, (d) a method in which the user (sender) inputs one's condition, and the generalization level allotted to the condition is used, and (e) a method in which the user's (sender's) present condition is automatically detected, and the generalization level allotted to the detected condition is used. Although all of these modes are shown in FIG. 12, one of them or a combination of a number of them is used when the invention is carried out.

Third Embodiment

The communication apparatus in accordance with a third embodiment has, in addition to the configuration of the first embodiment, a generalization-level determining means for determining the generalization level by the above-described method (a) as well as the general-condition-data generation changeover means 121e. In FIG. 12, the generalization-level determining means is comprised of the generalization-level designating means 121c for designating the level value of the generalization level, the generalization-level storage means 123c for storing information in which the level value of the generalization level and the details of the generalization are made to correspond to each other, and the generalization-level control means 121g which determines the generalization level corresponding to the level value designated by the generalization-level designating means 121c by performing retrieval in the generalization-level storage means 123c, and imparts the same to the general-condition-data generating means 121h. The generalization-level designating means 121c accepts the designation by the user, and transmits to the generalization-level control means 121g the generalization level desired by the user. Consequently, it becomes possible to set an optimum generalization level for the user. A description of portions that are common to the first embodiment will be omitted.

Next, a description will be made of the operation of the third embodiment.

First, a description will be made of an outline of the operation. The data which is inputted by a situation-data input means 121d is subjected to generalization (degradation) processing by the general-condition-data generating means 121h, and is presented to an output means 122d through a transmitting-section communication control means 121i, the network 124, and the receiving-section communication control means 122c.

The general-condition-data generation changeover means 121e accepts the designation by the user, and effects a changeover as to whether the generalization processing is to be carried out by the general-condition-data generating means 121h. As a result, it becomes possible to effect communication while performing a changeover between ordinary communication and communication for transmitting a general condition.

In the generalization processing by the general-condition-data generating means 121h, the generalization-level control means 121g controls the generalization level by controlling the general-condition-data generating means 121h on the basis of the data stored in the generalization-level storage means 123c. Since this generalization-level control means 121g is provided, it is possible to vary the rate of transmitting the general condition of the sender.

Next, a detailed description will be made of processing by each section with reference to flowcharts.

Figure 14:
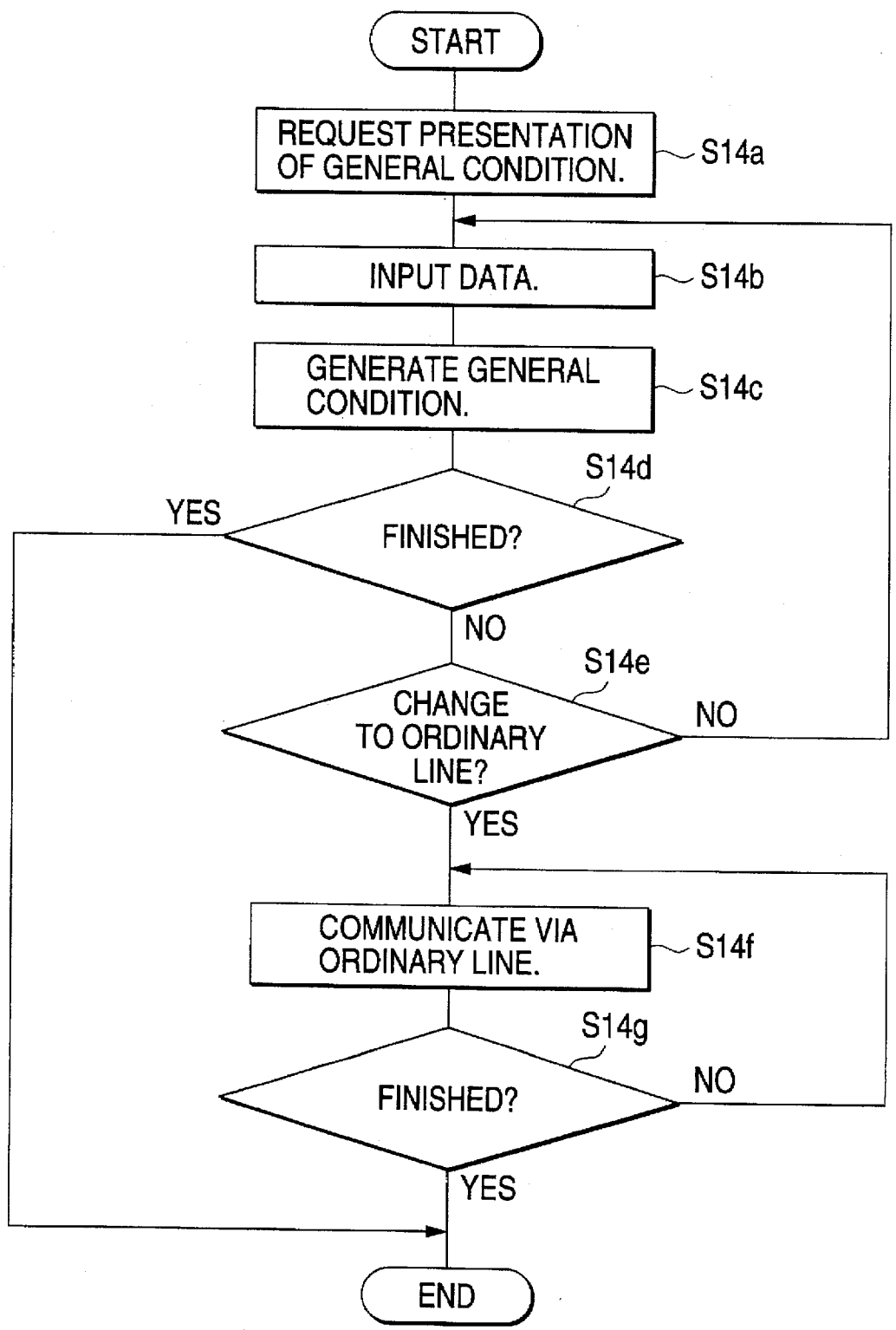
FIG. 14 is a flowchart illustrating an outline of the flow of processing in a case where communication is effected while whether or not a general-condition-data generating means is to be used is being changed over by a general-condition-data changeover means.

FIG. 14 is a flowchart illustrating an example in which communication is effected while a changeover regarding whether the general-condition-data generating means 121h is to be used is being carried out by the general-condition-data generation changeover means 121e.

Figure 3:
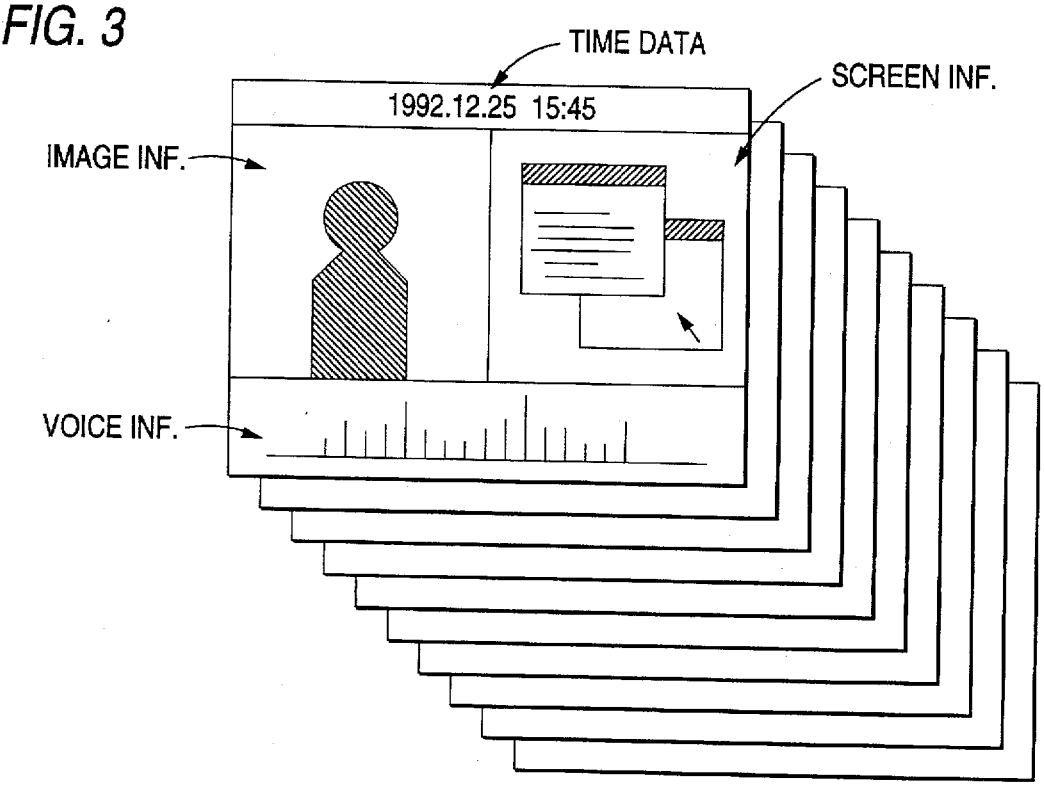
FIG. 3 is a diagram illustrating an example of various kinds of data stored in a storage means.
Figure 15:
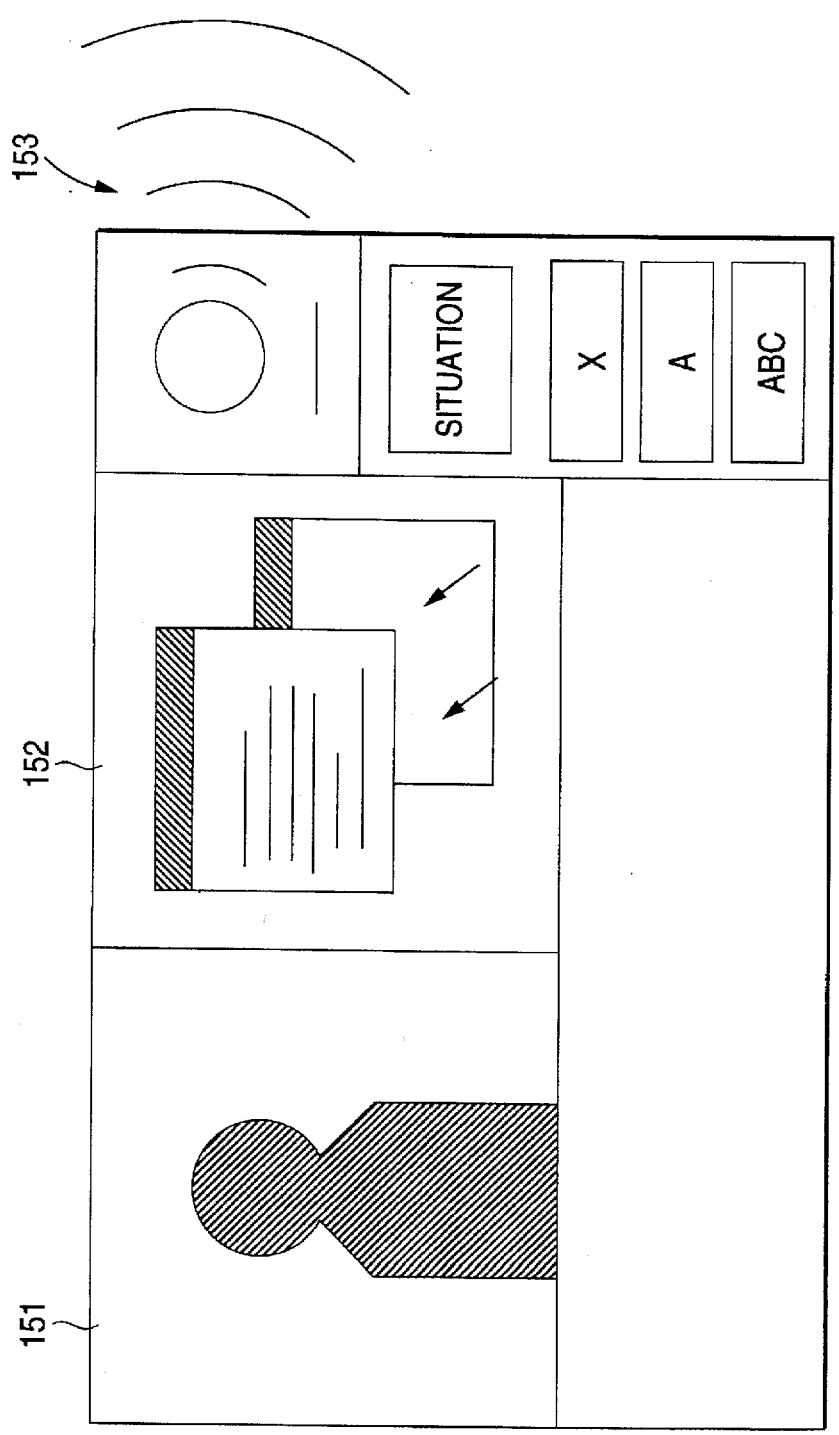
FIG. 15 is a diagram of an example of data which are stored in a general-condition-data storage means.

First, the receiving side requests from the general-condition presentation requesting means 122e the presentation of the general condition (Step S14a). This request is transmitted to the general-condition-data generating means 121h through the network 124 and the transmitting-section communication control means 121i. On the basis of inputted data on such as images, voice, and the screen inputted by the situation-data input means 121d (Step S14b), the general-condition-data generating means 121h generates general-condition data, which are stored in the general-condition-data storage means 122b through the transmitting-section communication control means 121i, the network 124, and the receiving-section communication control means 122c. In this example, since generalization is effected by method of thinning out information, the general-condition data are stored in the form of general-condition data consisting of image information, screen information, voice information and the like which are sampled at predetermined periods of time, as shown in FIG. 3. Finally, the general-condition data are consecutively outputted to the output means 122d in accordance with the time sequence in which the data were generated, as shown in FIG. 6 (Step S14c). If the objective is attained by the general-condition data and is satisfactory, the processing ends there (Step S14d). If necessary, however, the line is changed over to the ordinary line, in which the general-condition-data generating means 121h is invalidated, by the general-condition-data generation changeover means 121e (Step S14e), and communication is made with the other party by using the ordinary line through, for instance, image information 151 showing the situation of the other party in real time, screen information 152 displayed on the computer, voice information 153, and the like, as shown in FIG. 15 (Step S14f). After the objective is attained by communication through the ordinary line, the processing ends (Step S14g).

Figure 16:
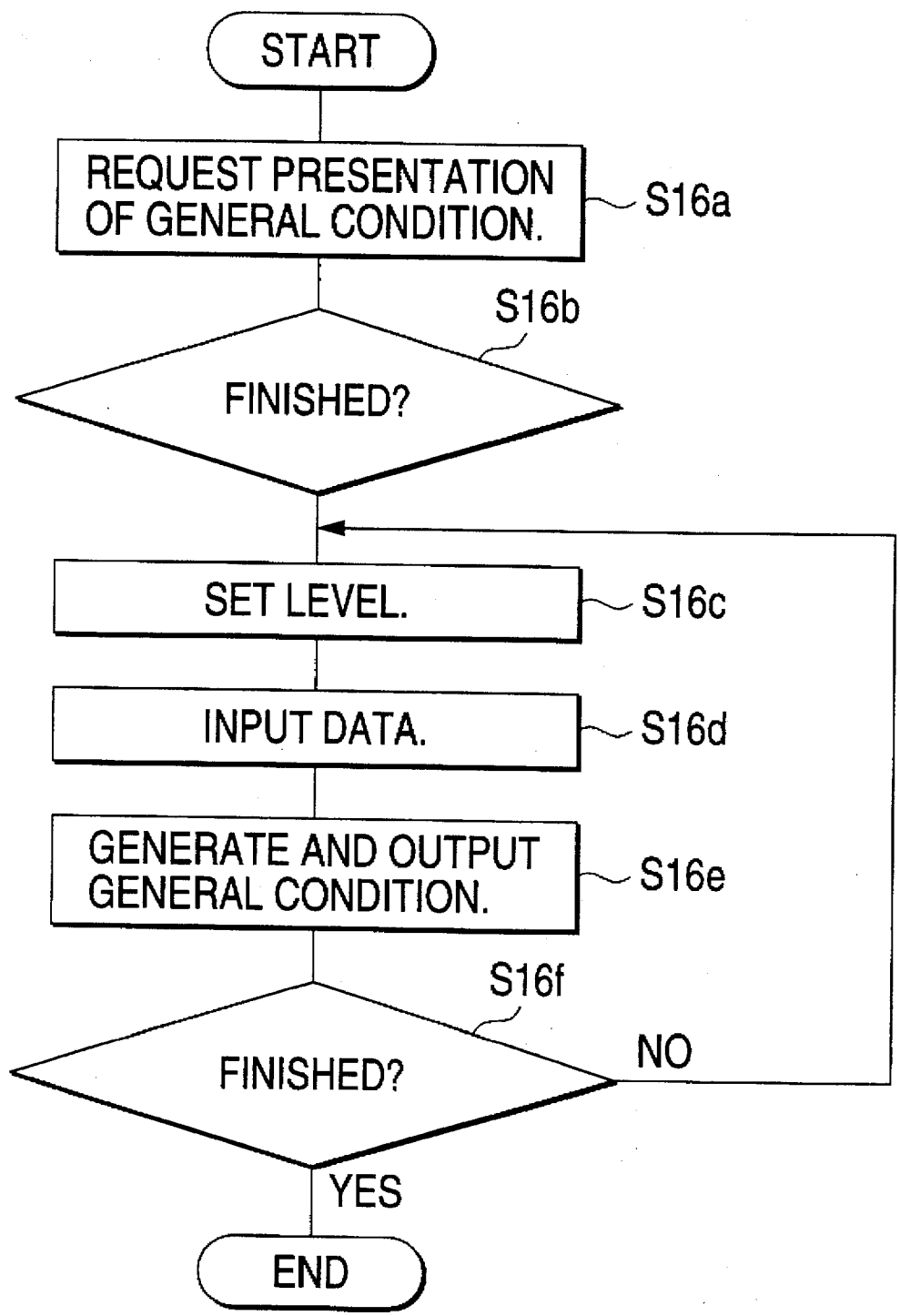
FIG. 16 is a diagram illustrating the flow of processing in an example where communication is effected by changing the generalization level of general-condition data in stages.

FIG. 16 is a flowchart illustrating a case in which the generalization level of the general-condition data generated by the general-condition-data generating means is changed in steps, as necessary, so as to carry out communication.

In this example, it is assumed that the generalization levels are designated in advance by the generalization-level designating means 121c. FIG. 17 shows an example of the generalization levels stored in the generalization-level storage means 123c. In this example, the arrangement provided is such that level 5 is given a high generalization level (i.e.e.g, since intense generalization is provided, the general condition of the other party is difficult to perceive), while level 1 is given a low generalization level (i.e., since very little generalization is provided, the general condition of the other party is easy to perceive). The details (rule) of generalization are determined for each level of each medium, and in this example the level is determined by a time interval of sampling and the degree of quantization.

First, the receiving side requests the presentation of the general condition from the general-condition presentation requesting means 122e (Step S16a). This request is transmitted to the generalization-level control means 121g through the receiving-section communication control means 122c, the network 124, and the transmitting-section communication control means 121i. The generalization-level control means 121g retrieves generalization-level data stored in the generalization-level storage means 123c through the transmitting-section communication control means 121i, the network 124, the data-retaining-section communication control means 123a, and the data retrieving means 123b (Step S16b). The generalization-level control means 121g controls the general-condition-data generating means 121h so as to provide a setting to generalize the data in correspondence with the requested generalization level (Step S16c). On the basis of the input data such as images, voice, and the screen inputted by the situation-data input means 121d (Step S16d), the general-condition-data generating means 121h generates the general-condition data corresponding to the generalization level, stores the general-condition data in the general-condition-data storage means 122b through the transmitting-section communication control means 121i, the network 124, and the receiving-section communication control means 122c, and outputs the same to the output means 122d (Step S16e). If the objective is attained by the general-condition data and is satisfactory, the processing ends there (Step S16f).

Figure 18:
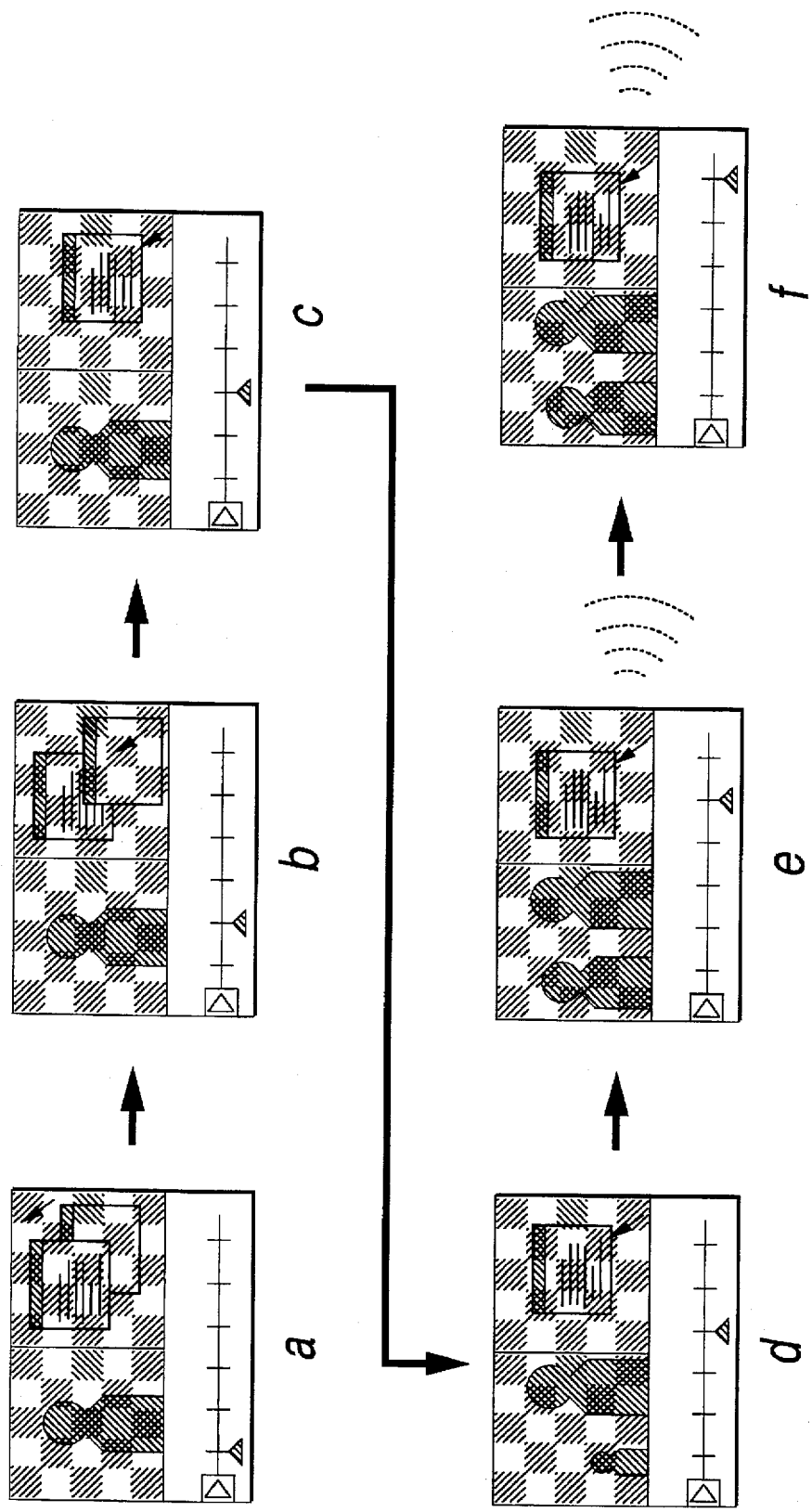
FIG. 18 is a diagram illustrating an example of an output of the general-condition data in a case where the generalization level is changed.

FIG. 18 is an example of the general-condition data presented at a generalization level different from the one shown in the example in FIG. 6. In this case, in addition to the thinning out of information, quantization and the mixing in of noise are provided, thereby making it difficult to ascertain the general condition of the other party.

Fourth Embodiment

The communication apparatus in accordance with a fourth embodiment differs from the apparatus of the third embodiment in that the aforementioned method (b) is used as the generalization-level determining means. This generalization-level determining means is comprised of the general-condition presentation requesting means 122e for the user (receiver) to request the presentation of the general condition, the receiver-name input means 122f for inputting the name of the receiver and the like, the receiver-level storage means 123d for storing the generalization level for each receiver, and the generalization-level control means 121g which determines the receiver level corresponding to the inputted name of the receiver by performing retrieval in the receiver-level storage means 123d, and imparts the same to the general-condition-data generating means 121h. In addition, the generalization-level determining means based on the method (b) has the receiver-minimum-level storage means 123e for storing a minimum generalization level allowed to the receiver corresponding to the inputted name of the receiver.

In operation, retrieval is performed in the receiver-level storage means 123d on the basis of the name of the receiver inputted from the receiver-name input means 122f, and the generalization level of the receiver is set automatically, and is transmitted to the generalization-level control means 121g. The generalization-level control means 121g controls the general-condition-data generating means 121h to provide the general-condition data. As a result, it becomes possible to provide the general condition at a predetermined generalization level corresponding to the receiver. In a case where the generalization level is changed by the generalization-level designating means 121c, retrieval is performed in the receiver-minimum-level storage means 123e, and control is provided such that the generalization level does not become lower than the allowed generalization level. Thus, it is possible to prevent the provision of information at a level lower than the generalization level allowed to that receiver (i.e., information of high quality). The other arrangements and operation are similar to those of the third embodiment.

Figure 19:
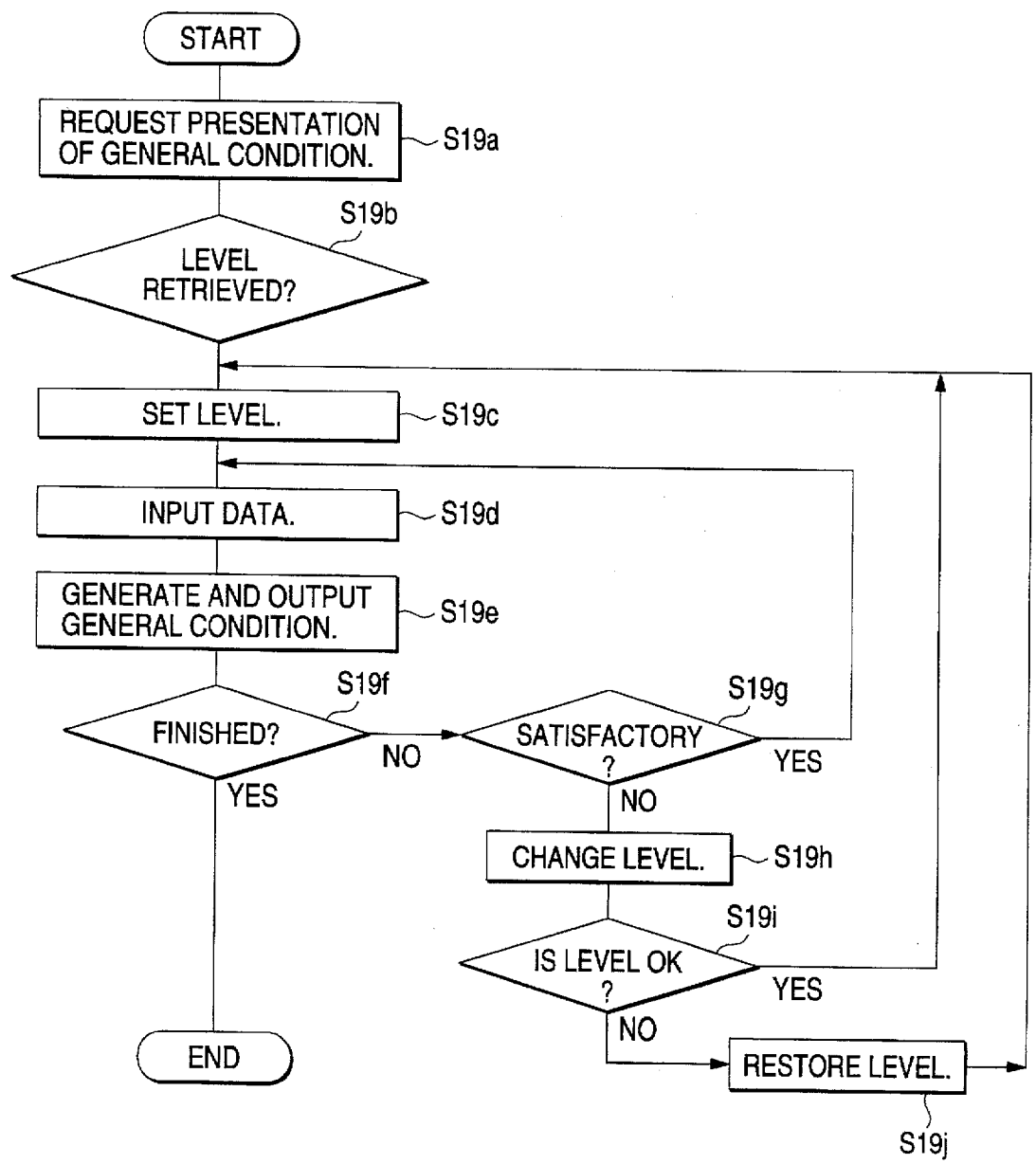
FIG. 19 is a flowchart illustrating the flow of processing in a case where communication is effected by changing the generalization level in stages in correspondence with the user (receiver) who requested the general-condition data.

FIG. 19 as a flowchart illustrating an example in which communication is effected by changing the generalization level in stages in correspondence with the user (receiver) who requested the general-condition data, by using the receiver-name input means 122f as the generalization-level determining means and by referring to the receiver-level storage means 123d and the receiver-minimum-level storage means 123e.

First, the receiving side requests the presentation of the general condition together with one's user name from the general-condition presentation requesting means 122e (Step S19a). This request is transmitted to the generalization-level control means 121g through the receiving-section communication control means 122c, the network 124, and the transmitting-section communication control means 121i. The generalization-level control means 121g retrieves a generalization-level setting for each receiver stored in the receiver-level storage means 123d in the form such as the one shown in FIG. 20, through the transmitting-section communication control means 121i, the network 124, the data-retaining-section communication control means 123a, and the data retrieving means 123b. Further, the generalization-level control means 121g obtains the generalization level by performing retrieval in the generalization-level storage means 123c (Step S19b). Then, the generalization-level control means 121g controls the general-condition-data generating means 121h so as to provide a setting to generalize the data in correspondence with the retrieved generalization level (Step S19c). On the basis of the input data such as images, voice, and the screen inputted by the situation-data input means 121d (Step S19d), the general-condition-data generating means 121h generates the general-condition data corresponding to the generalization level, stores the general-condition data in the general-condition-data storage means 122b through the transmitting-section communication control means 121i, the network 124, and the receiving-section communication control means 122c, and outputs the same to the output means 122d (Step S19e). If the objective is attained by the general-condition data and is satisfactory, the processing ends there (Step S19f). However, if it is still unable to ascertain the condition of the other party at the present generalization level (Step S19g), the generalization level is lowered (Step S19h). Further, in order to determine whether that generalization level is allowed to the receiver, the generalization-level control means 121g retrieves the minimum generalization level allowed to the receiver and stored in the receiver-minimum-level storage means 123e in the form such as the one shown in FIG. 21, through the transmitting-section communication control means 121i, the network 124, the data-retaining-section communication control means 123a, and the data retrieving means 123b (Step S19i). If the level has been allowed, the generalization level is set to that level, and the general-condition data is then presented, but if the level has not been allowed, the generalization level is returned to the former level, and the general-condition data is presented (Step S19j).

Fifth Embodiment

The communication apparatus in accordance with a fifth embodiment differs from the apparatus of the third embodiment in that the aforementioned method (c) is used as the generalization-level determining means. This generalization-level determining means is comprised of the condition input means 121b for inputting the sender's condition and the condition-level storage means 123f for storing the generalization level corresponding to the sender's condition. In this embodiment, on the basis of the sender's condition inputted from the condition input means 121b, retrieval is performed in the condition-level storage means 123f, and the generalization level designated for that condition is transmitted to the generalization-level control means 121g. The generalization-level control means 121g controls the general-condition-data generating means 121h correspondingly, so as to provide the general-condition data. Consequently, it becomes possible to provide the general-condition data at a generalization level appropriate for the condition in which the sender is placed.

Figure 22:
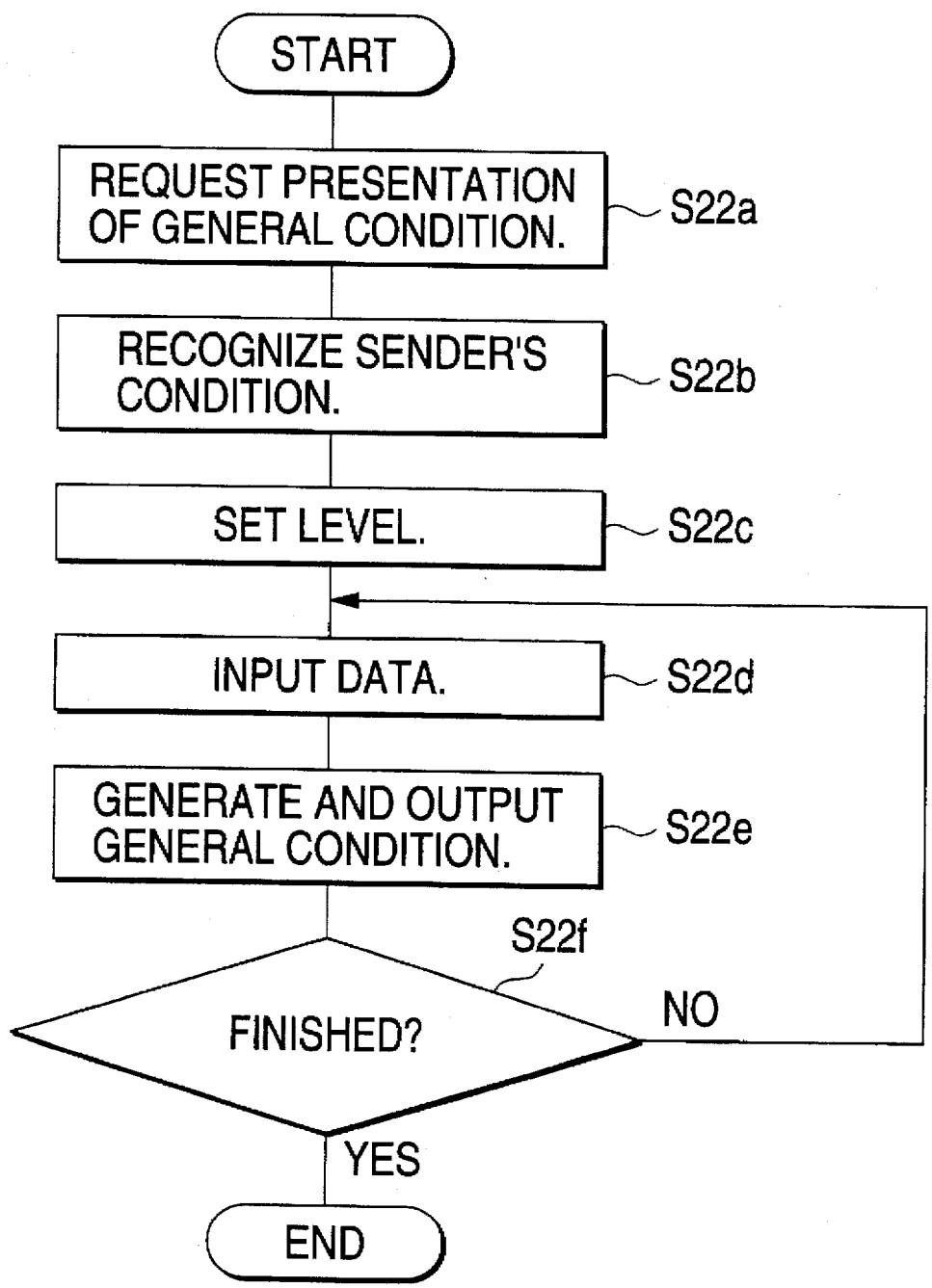
FIG. 22 is a flowchart illustrating the flow of processing in a case where communication is effected by changing the generalization level in stages in correspondence with the condition of the sender.

FIG. 22 is a flowchart illustrating an example in which communication is carried out by changing the generalization level in stages in correspondence with the sender's condition.

First, the receiving side requests from the general-condition presentation requesting means 122e the presentation of the general condition (Step S22a). The request is transmitted to the generalization-level control means 121g through the receiving-section communication control means 122c, the network 124, and the transmitting-section communication control means 121i. Then, the present condition of the sender is ascertained (Step S22b).

The sender inputs in advance the present condition through the condition input means 121b. For instance, the present conditions may include "having a visitor," "preparing a document," "absent," and the like. On the basis of this condition data, the generalization-level control means 121g retrieves data stored in the condition-level storage means 123f in the form such as the one shown in FIG. 23, through the transmitting-section communication control means 121i, the network 124, the data-retaining-section communication control means 123a, and the data retrieving means 123b.

The generalization setting data for each level stored in the generalization-level storage means 123c in the form such as the one shown in FIG. 26 is retrieved on the basis of the generalization level obtained as described above. The general-condition-data generating means 121h is controlled on the basis of this data, and the generalization level is set (Step S22c). On the basis of the input data such as images, voice, and the screen inputted by the situation-data input means 121d (Step S22d), the general-condition-data generating means 121h generates the general-condition data corresponding to the generalization level, stores the general-condition data in the general-condition-data storage means 122b through the transmitting-section communication control means 121i, the network 124, and the receiving-section communication control means 122c, and outputs the same to the output means 122d (Step S22e). If the objective is attained by the general-condition data and is satisfactory, the processing ends there (Step S22f).

Sixth Embodiment

A sixth embodiment uses the aforementioned method (e) as the generalization-level determining means, which is provided with the condition detecting means 121a for detecting the sender's condition and the condition-detecting-rule storage means 121f for storing rules for estimating the condition on the basis of the data from the condition detecting means 121a, so as to automatically detect the condition. This embodiment differs from the fifth embodiment in the manner of ascertaining the condition, i.e., the content of Step S22b in the processing flow in FIG. 22. The condition detecting means 121a detects the present condition of the sender. As the condition detecting means 121a, any means may be used such as a time card system, a voice detection device, and a file system of a computer insofar as it is capable of ascertaining the action of the users. However, since information which can be detected by automatic detecting means is limited, the condition is assessed from the detected data on the basis of rules stored in the condition-detecting-rule storage means 121f in the form such as the one shown in FIG. 24. On the basis of the condition data, the generalization-level control means 121g retrieves data stored in the condition-level storage means 123f in the form such as the one shown in FIG. 23, through the transmitting-section communication control means 121i, the network 124, the data-retaining-section communication control means 123a, and the data retrieving means 123b, thereby obtaining a generalization level. The processing after the generalization level is determined, i.e., the processing in Steps S22c to S22f, is similar to that of the fifth embodiment. According to this embodiment, it is possible to automatically assess the condition in which the sender is placed, and it becomes possible to provide the general-condition data at a generalization level appropriate for that condition.

Seventh Embodiment

In a seventh embodiment, the generalization-level control means 121g, the schedule storage means 123g, and the condition-level storage means 123f are provided as the generalization-level determining means, so as to automatically ascertain the condition. This embodiment differs from the fifth embodiment in the manner of ascertaining the condition, i.e., the content of Step S22b in the processing flow in FIG. 22. The generalization-level control means 121g retrieves schedule data stored in the schedule storage means 123g in the form such as the one shown in FIG. 25, through the transmitting-section communication control means 121i, the network 124, the data-retaining-section communication control means 123a, and the data retrieving means 123b, and retrieves data stored in the condition-level storage means 123f in the form such as the one shown in FIG. 23, thereby obtaining a generalization level for each period of time shown in FIG. 26. The processing after the generalization level is determined, i.e., the processing in Steps S22c to S22f, is similar to that of the fifth embodiment. According to this embodiment, it is possible to automatically assess the condition in which the sender is placed on the basis of the sender's schedule, and it becomes possible to provide the general-condition data at a generalization level appropriate for that condition.

Eighth Embodiment

The communication apparatus in accordance with an eighth embodiment differs from the apparatus of the third embodiment in that the aforementioned method (d) is used as the generalization-level determining means. This generalization-level determining means is comprised of the general-condition presentation requesting means 122e, the sender designating means 122g for designating the sender for presenting the general-condition data, and the sender-level storage means 123h for storing the generalization level for each sender.

In operation, the receiver designates the sender by means of the sender designating means 122g. On the basis of the designated sender, retrieval is made in the sender-level storage means 123h, and the generalization level allotted to that sender is transmitted to the generalization-level control means 121g. The generalization-level control means 121g controls the general-condition-data generating means 121h correspondingly, ad provides the general-condition data. Consequently, when the general-condition data of a particular sender among a plurality of senders is viewed, it becomes possible to automatically designate the generalization level.

Ninth Embodiment

The communication apparatus in accordance with a ninth embodiment differs from the apparatus of the eighth embodiment in that the generalization-level determining means is so arranged that the conditions of a plurality of senders can be ascertained. This generalization-level determining means is comprised of the general-condition presentation requesting means 122e, the sender designating means 122g for designating the sender for presenting the general-condition data or the sender-group designating means 122h for designating the group of senders for presenting the general-condition data, and the sender-level storage means 123h for storing the generalization level for each sender. The receiver designates the group whose general condition the receiver wants to know by means of the sender-group designating means 122h. The group name is retrieved from the group-data storage means 123i to obtain information on the group members. Furthermore, on the basis of the information on the group members, retrieval is carried out in the sender-level storage means 123h to obtain the generalization levels of the respective members. These generalization levels are transmitted to the generalization-level control means 121g of the respective senders. The generalization-level control means 121g controls the general-condition-data generating means 121h to provide the general-condition data. Finally, the output control means 122a synthesizes the general-condition data, and provides the same to the output means 122d. Consequently, as the group is designated, it becomes possible to ascertain the general condition of a plurality of senders (group members) at an appropriate generalization level.

Figure 27:
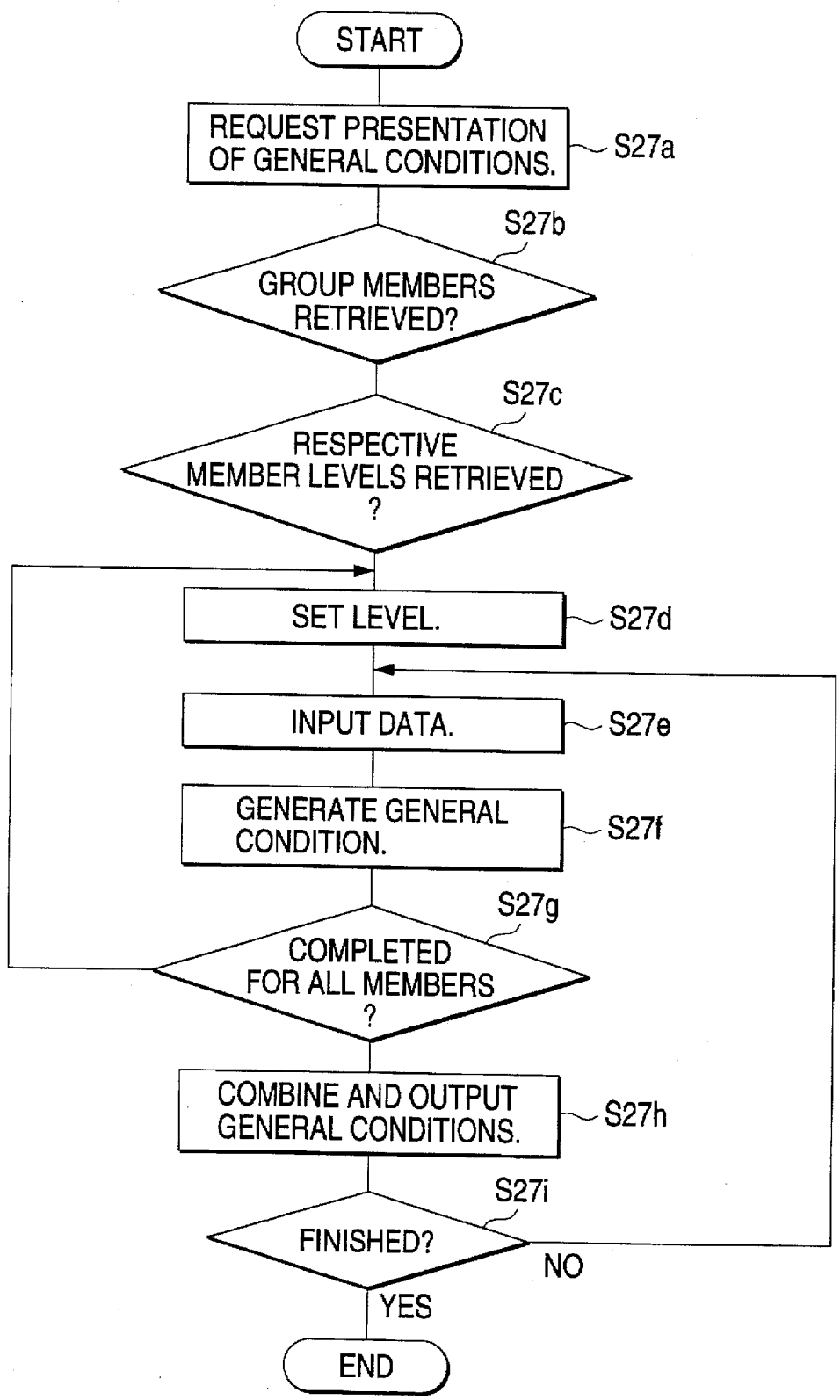
FIG. 27 is a flowchart illustrating the flow of processing for effecting communication in such a manner as to ascertain the conditions of a plurality of senders.

FIG. 27 is a flowchart for effecting communication for ascertaining the condition of a plurality of senders as described above.

Figure 30:
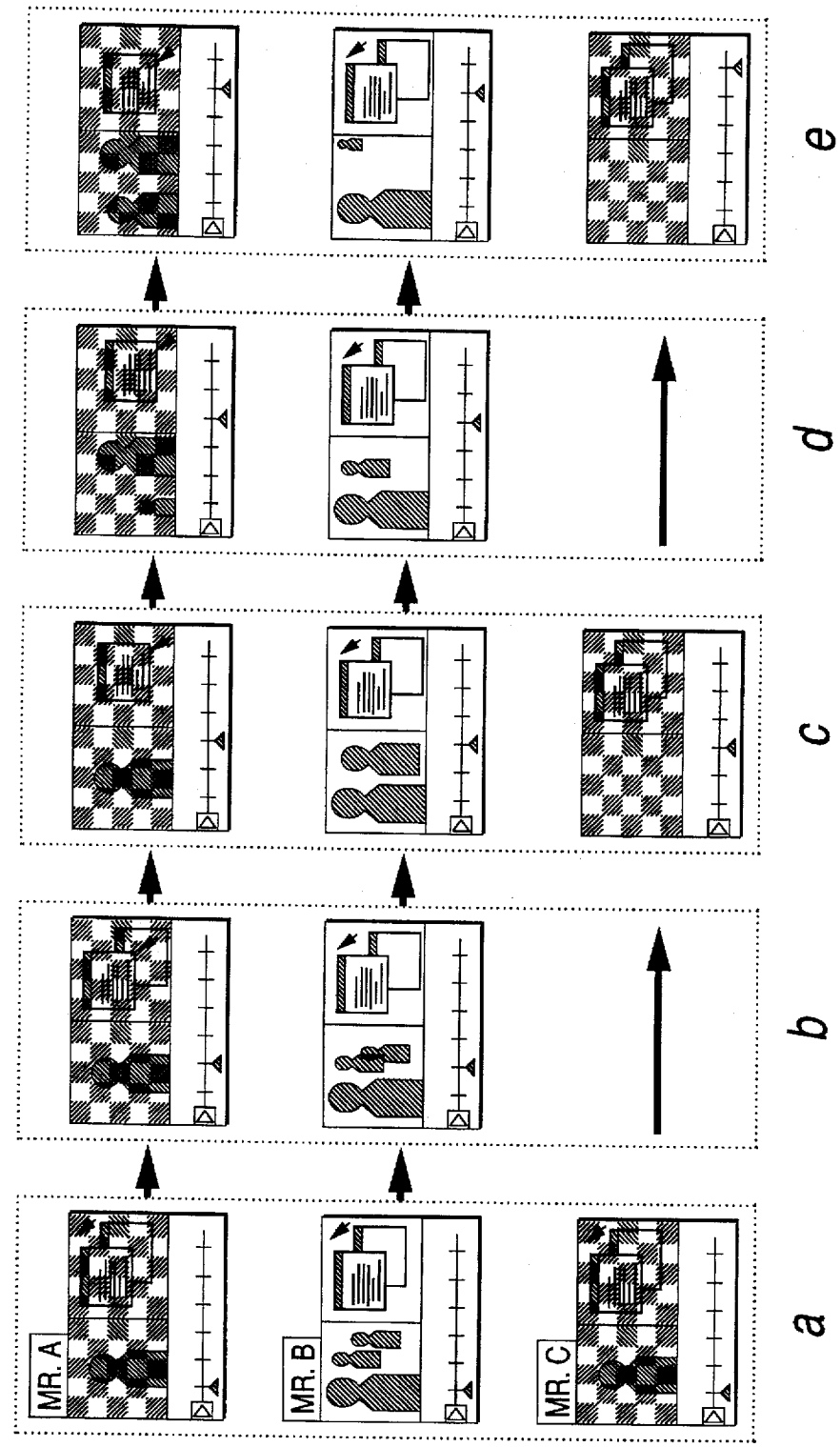
FIG. 30 is a diagram illustrating an example of a synthesized output of the general-condition data on a plurality of users.

First, the receiving side designates the name of a group whose general condition the receiving side is to be ascertained by means of the sender-group designating means 122h, and requests through the general-condition presentation requesting means 122e the presentation of the general condition (Step S27a). The request is transmitted to the generalization-level control means 121g through the receiving-section communication control means 122c, the network 124, and the transmitting-section communication control means 121i. The generalization-level control means 121g retrieves the data on group members stored in the group-data storage means 123i in the form such as the one shown in FIG. 28, through the transmitting-section communication control means 121i, the network 124, the data-retaining-section communication control means 123a, and the data retrieving means 123b, thereby obtaining the data on the group members (Step S27b). Further, the generalization-level control means 121g retrieves the generalization-level data for each sender (Mr. A, Mr. B, Mr. A, . . . ) stored in the sender-level storage means 123h in the form such as the one shown in FIG. 29 (Step S27c). On the basis of the retrieved generalization-level data, the general-condition-data generating means 121h is controlled for each member to set the generalization level (Step S27d). Then, on the basis of the input data such as the images, voice, and the screen inputted by the situation-data input means 121d (Step S27e), the general-condition-data generating means 121h generates the general-condition data corresponding to the generalization level (Step S27f). This processing is repeated in a number corresponding to the number of the members (Step S27g). Finally, the general-condition data on the respective members are stored in the general-condition-data storage means 122b through the transmitting-section communication control means 121i, the network 124, and the receiving-section communication control means 122c, are synthesized by the output control means 122a, and are outputted to the output means 122d (Step S27h). If the objective is attained by the general-condition data and is satisfactory, the processing ends there (Step S27i). FIG. 30 shows an example in which the general condition of the members of an "ABC circle" is presented. Different generalization levels are set for Mr. A, Mr. B, and Mr. C, and their general conditions are combined and outputted.

In the above-described processing flow of the ninth embodiment, a description has been made of an example of processing in which the sender group is designated by the sender-group designating means, but a plurality of senders may be designated by the sender designating means 122g instead of the sender-group designating means. In that case, the group-data storage means 123i is not required.

In the present invention, as described above, means are provided to make it possible to ascertain the situation of the other party in a stage prior to starting communication. Consequently, the party who wishes to start communication is capable of starting communication at an appropriate timing by taking into consideration the condition of the other party, the degree of importance of communication, and the like. In addition, there is also an advantage that, on the part of the party to which communication is requested, it is possible to reduce the number of cases where work is interrupted unnecessarily.

Moreover, in accordance with the present invention, when the situation of the other party is ascertained, the data which is communicated is generalized. This makes it possible to prevent the details of the work and the detailed movement of the party to be ascertained from being transmitted. Hence, it is possible to remove a psychological sense of oppression imparted to the party whose situation is ascertained. Namely, there is an advantage in that privacy can be protected.

Further, in accordance with the present invention, no particular operation is requested to the party whose situation is ascertained. This makes unnecessary the operation of describing one's condition by performing a complex operation prior to starting the work and the operation of canceling the condition after finishing the work. Namely, there is an advantage in that it is possible to prevent the occurrence of a decline in work efficiency and a misunderstanding.

In addition, in the present invention, means are provided to make it possible to store the generalized data and to present the same. Consequently, it is possible to ascertain changes over time in the situation of the other party. For instance, even when the other party is having a visitor, it is possible to determine whether the visitor is visiting just for a short time, or they are talking for a long time. In other words, there is an advantage in that it is possible to request a start of communication at an appropriate timing by viewing the changes over time.

Additionally, in the present invention, a number of kinds of data for ascertaining the situation of the other party are outputted by being synchronized with each other. As a result, there is an advantage in that it is possible to determine the situation of the other party from a multiplicity of angles on the basis of the plurality of kinds of data.

Additionally, in the present invention, the changes in the situation of the other party are consecutively outputted in accordance with the flow of time. This provides an advantage in that the situation of the other party is easy to understand when the changes over time in the situation of the other party are ascertained.

Additionally, in the present invention, the changes in the situation of the other party are outputted at one time. This provides an advantage in that the changes in the situation of the other party can be ascertained at one time.

Additionally, in the present invention, the changes in the situation of the other party are consecutively outputted, and the outputted results are superposed one on top of another. As a result, in addition to the advantage that the changes over time in the situation of the other party are easy to understand, there is an advantage in that the changes can be ascertained at one time from a final output result.

Additionally, in the communication apparatus of the present invention, since the generalization level of the general-condition data can be changed in a multiplicity of stages, it is possible to provide appropriate general-condition data in correspondence with the relationship with the other party or the condition thereof.

Additionally, in the communication apparatus of the present invention, it is possible to vary the generalization level in response to a user's request, so that it is possible to cope with cases where it is desirable to obtain more detailed information on the changes of the situation or the general condition.

In the communication apparatus of the present invention, it is possible to automatically change the generalization level in accordance with the receiver. This makes it possible to set in advance different generalization levels for respective receivers.

Incidentally, an arrangement can be provided such that a minimum generalization level is set for each receiver. If this arrangement is adopted, it is possible to provide such a setting that the details of the general condition of a particular member of a group can be ascertained, but in the case of an outsider party it is possible to ascertain the general condition only to such an extent that the party is at his or her desk.

Additionally, in the communication apparatus of the present invention, it is possible to change the generalization level in correspondence with a sender. This makes it possible to designate a sender and ascertain the general condition of the other party at a preset generalization level. In addition, in a mode in which a plurality of senders are designated, or a sender group is designated, it is possible to ascertain at one time the general condition at a generalization level set in advance for each sender or the members of the sender group.

In the communication apparatus of the present invention, it is possible to change the generalization level in accordance with the condition of the sender.

In the present invention, since the general-condition-data generation changeover means is additionally provided, it is possible to proceed to ordinary communication smoothly after ascertaining the general condition. In addition, it is possible to share the ordinary communication line and the line for communication of the general condition.

What is claimed is:

1. A communication apparatus comprising:
    a transmitting section comprising:
        means for capturing situation data representing a communicative status of a sender prior to communicating to the sender, the situation data includes at least one of image data, voice data and computer screen data;
        data generating means for degrading the situation data to form degraded situation data and to generate generalized status data representing a communicative status of the sender and including the degraded situation data, wherein the degraded situation data renders details of the at least one of image data, voice data and computer screen data imperceptible;
        transmitting section communication control means for transmitting the generalized status data; and
    a receiving section comprising:
        receiving section communication control means for receiving the generalized status data from said transmitting section prior to communicating to the sender, thus enabling recognition of the generalized status of the sender without revealing details of the at least one of image data, voice data and computer data;
        means for outputting the generalized status of the sender including the degraded situation data; and
    a network for interconnecting said transmitting section and said receiving section.

2. The communication apparatus according to claim 1, further comprising means for storing the generalized status data.

3. The communication apparatus according to claim 1, further comprising:
    means for storing a plurality of the generalized status data including the degraded situation data which are generated at different times, and
    output control means for controlling the outputting means so that the outputting means sequentially outputs a plurality of the generalized status data in time order of the generation of the generalized status data.

4. The communication apparatus according to claim 1, further comprising degree determining means for determining a degree of degrading used when said data generating means degrades the situation data to generate the generalized status data.

5. The communication apparatus according to claim 2, further comprising output control means for controlling an outputting form of said outputting means.

6. The communication apparatus according to claim 4, wherein said degree determining means comprises:
    means for designating a degrading level;
    means for storing degrading degrees corresponding to respective degrading levels; and
    means for determine the degrading degree by referring to said degrading degrees storing means based on the designated degrading level.

7. The communication apparatus according to claim 4, wherein said degree determining means comprises:
    means for designating a name of a receiver who requested presentation of generalized status data;
    means for storing degrading degrees preset for respective receivers; and
    means for determining the degrading degree by referring to the degrading degrees storing means based on the designated receiver name.

8. The communication apparatus according to claim 4, wherein said degree determining means comprises:
    means for designating one or a plurality of senders or a sender group;
    means for storing degrading degrees preset for the respective senders; and
    means for determining the degrading degree of the designated sender or senders or members of the sender group by referring to the degrading degrees storing means,
    wherein said output control means controls the outputting means so that the outputting means outputs the generalized status data of the respective designated senders in a prescribed form.

9. The communication apparatus according to claim 4, wherein said generalization degree determining means comprises:
    means for enabling manual input of a sender's communicative status;
    means for storing degrading degrees preset for respective sender statuses; and means for determining the degrading degree corresponding to the input sender's status by referring to the degrading degrees storing means.

10. The communication apparatus according to claim 5, wherein said output control means has means for synchronously outputting plural kinds of data representing the generalized status of the sender.

11. The communication apparatus according to claim 5, wherein said output control means controls the outputting means so that the outputting means outputs a plurality of data representing the generalized status of the sender stored in said storing means.

12. The communication apparatus according to claim 5, wherein said output control means controls the outputting means so that the outputting means sequentially outputs a plurality of data representing the generalized status of the sender stored in said storing means, with later occurring data superimposed on previous data.

13. The communication apparatus according to any one of claims 1 to 9, further comprising;

means for determining whether to use said generalized status data generating means.

14. A communication apparatus in which a receiving section recognizes an environment of a transmitting section based on environmental information of the transmitting section, which information is transmitted through a network, said communication apparatus comprising:

means for capturing environment information of a transmitting section;

means, provided in a receiving section, for requesting a particular transmitting section to transmit its environmental information;

data generating means for degrading the environmental information of said particular transmitting section to form degraded environmental information and to generate generalized communicative status data including the degraded environmental information in response to the request from said receiving section, wherein the degraded environmental information renders details of the environmental information imperceptible; and means for outputting the generalized status data including the degraded environmental information received by said receiving section.

15. A communication apparatus in which a receiving section recognizes an environment of a transmitting section based on environmental information of the transmitting section, which information is transmitted through a network, said communication apparatus comprising:

means for capturing environmental information of a transmitting section;

means for setting a disclosure-permitting level to which the environmental information is permitted to be disclosed to another party;

means for storing the set disclosure-permitting level;

means, provided in a receiving section, for requesting a particular transmitting section to transmit its environmental information;

generating means for degrading the environmental information of said particular transmitting section to generate generalized communicative status data, including the degraded environmental information based on the stored disclosure-permitting level, in response to the request from said receiving section, wherein the degraded environmental information renders details of the environmental information imperceptible; and means for outputting the generalized status data including the degraded environmental information received by said receiving section.

16. The communication apparatus according to claim 15, wherein said generating means degrades the environmental information by thinning the environmental information.

17. The communication apparatus according to claim 15, wherein said generating means degrades the environmental information by mixing noise sound into the environmental information.

18. The communication apparatus according to claim 15, wherein said transmitting section further comprises means for switching between the generalized status data and data input through said inputting means, and for supplying the switched data to communication control means of said receiving section.

* * * * *

UNITED STATES PATENT AND TRADEMARK OFFICE
CERTIFICATE OF CORRECTION

PATENT NO. : 5,691,713
DATED : November 25, 1997
INVENTOR(S) : Eiji ISHIDA

It is certified that error appears in the above-indentified patent and that said Letters Patent is hereby corrected as shown below:

Claim 6, column 24, line 34, "determine" should read --determining--.

Signed and Sealed this

Twenty-sixth Day of May, 1998

Attest:

BRUCE LEHMAN

Attesting Officer

Commissioner of Patents and Trademarks